March 5, 1935.  C. A. KELSO  1,993,346

AUTOMATIC GRABBING AND CARRYING DEVICE

Filed July 15, 1932  9 Sheets-Sheet 1

INVENTOR
Clarence A. Kelso.

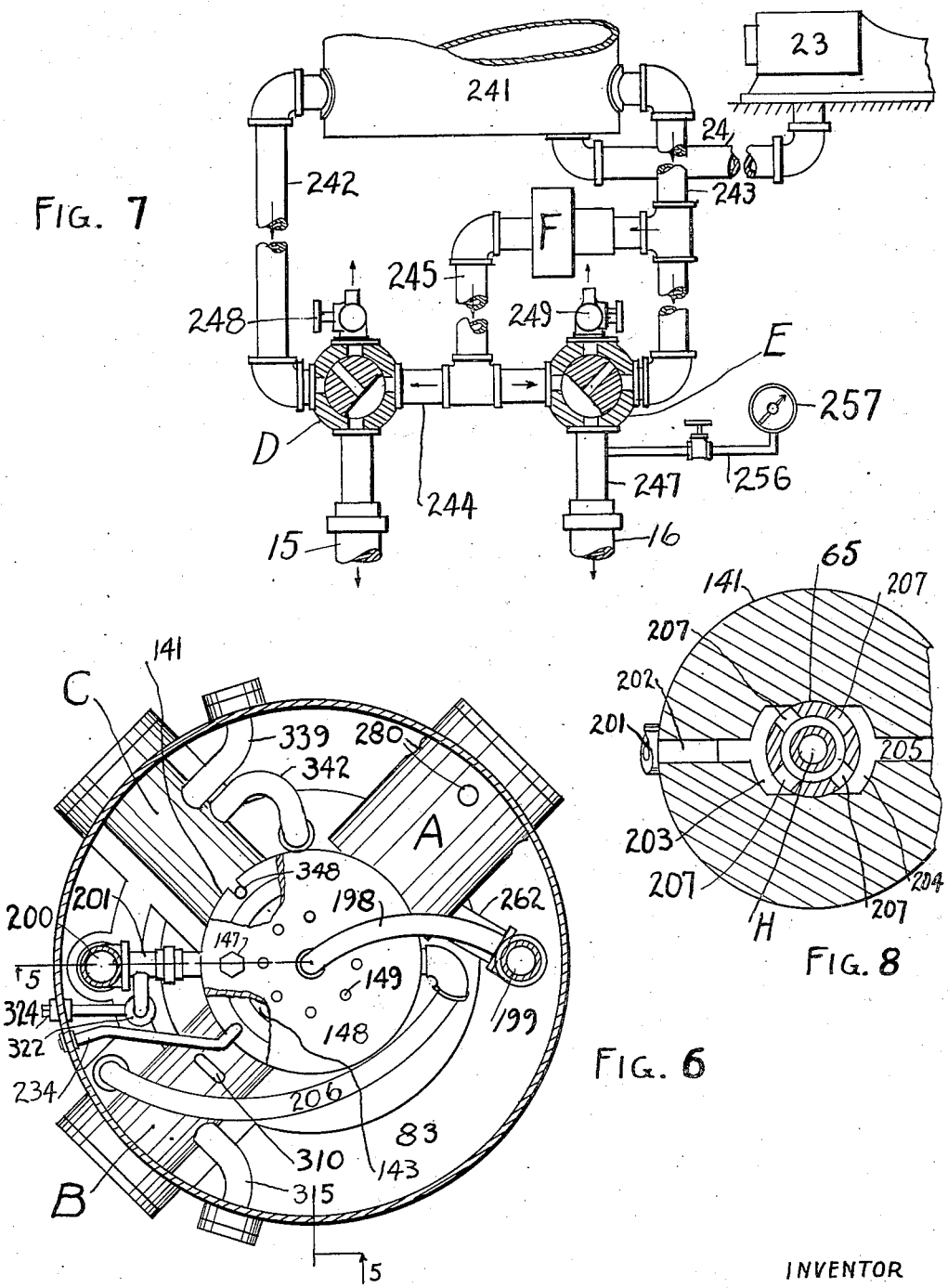

March 5, 1935.  C. A. KELSO  1,993,346
AUTOMATIC GRABBING AND CARRYING DEVICE
Filed July 15, 1932   9 Sheets-Sheet 4
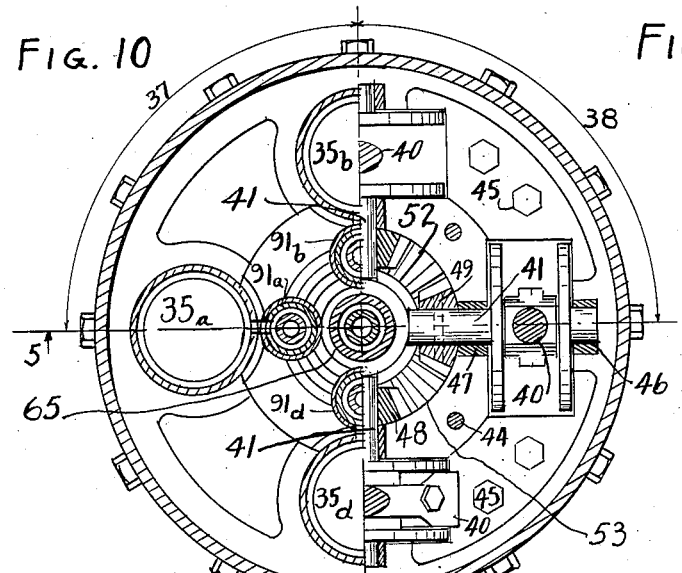
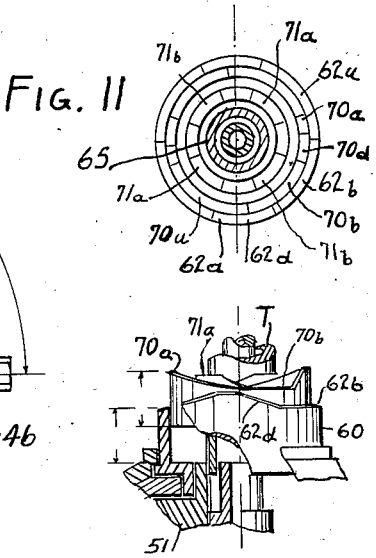
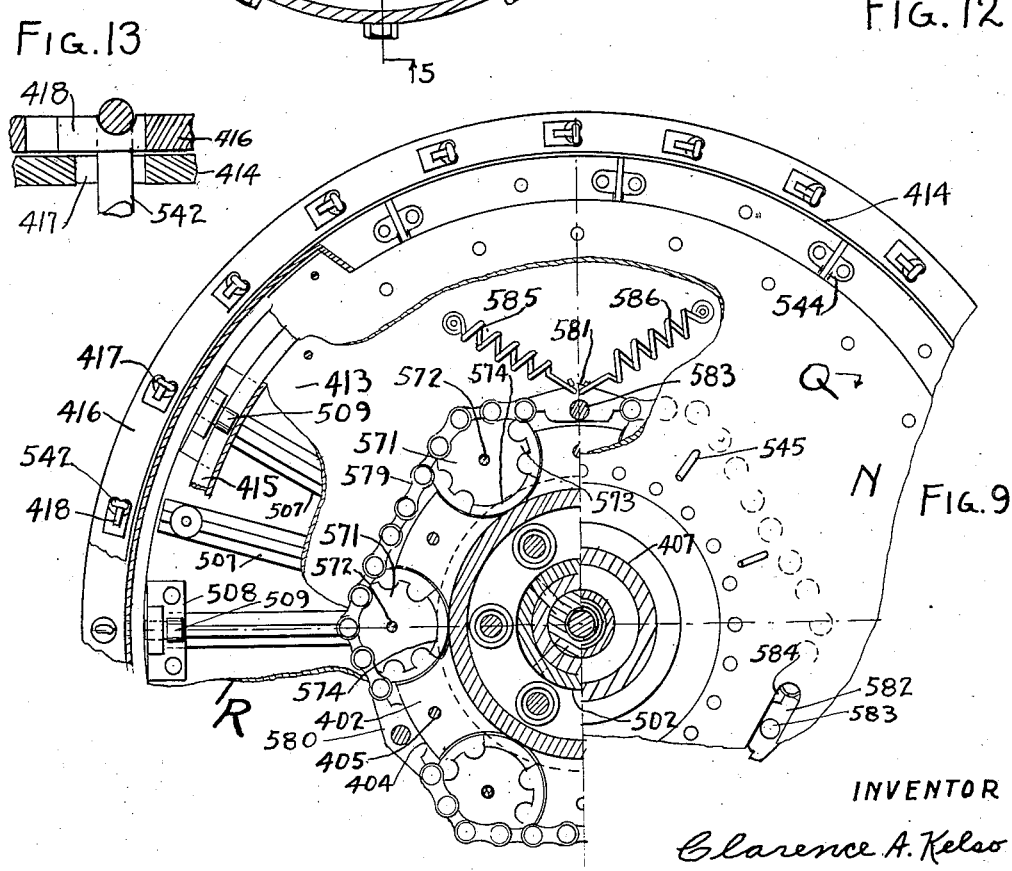
INVENTOR
Clarence A. Kelso March 5, 1935. C. A. KELSO 1,993,346
AUTOMATIC GRABBING AND CARRYING DEVICE
Filed July 15, 1932 9 Sheets-Sheet 5
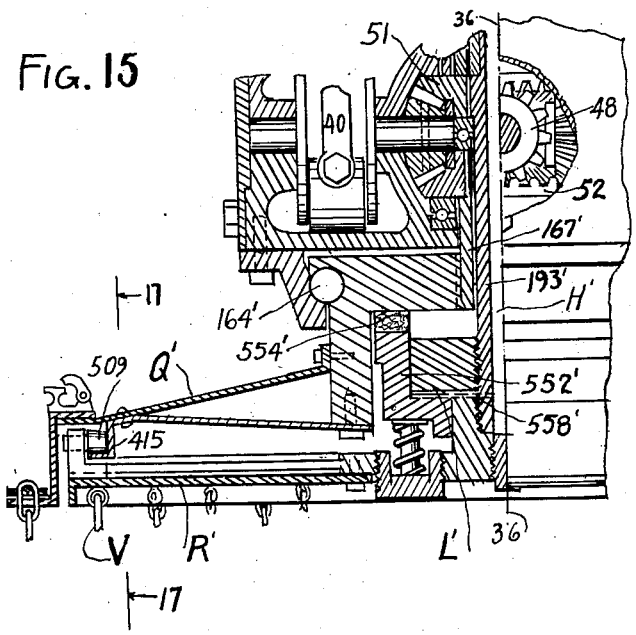
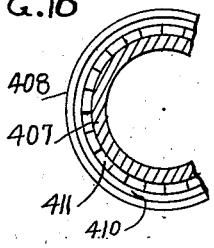
INVENTOR
Clarence A. Kelso March 5, 1935. C. A. KELSO 1,993,346
AUTOMATIC GRABBING AND CARRYING DEVICE
Filed July 15, 1932 9 Sheets-Sheet 6

INVENTOR
Clarence A. Kelso.

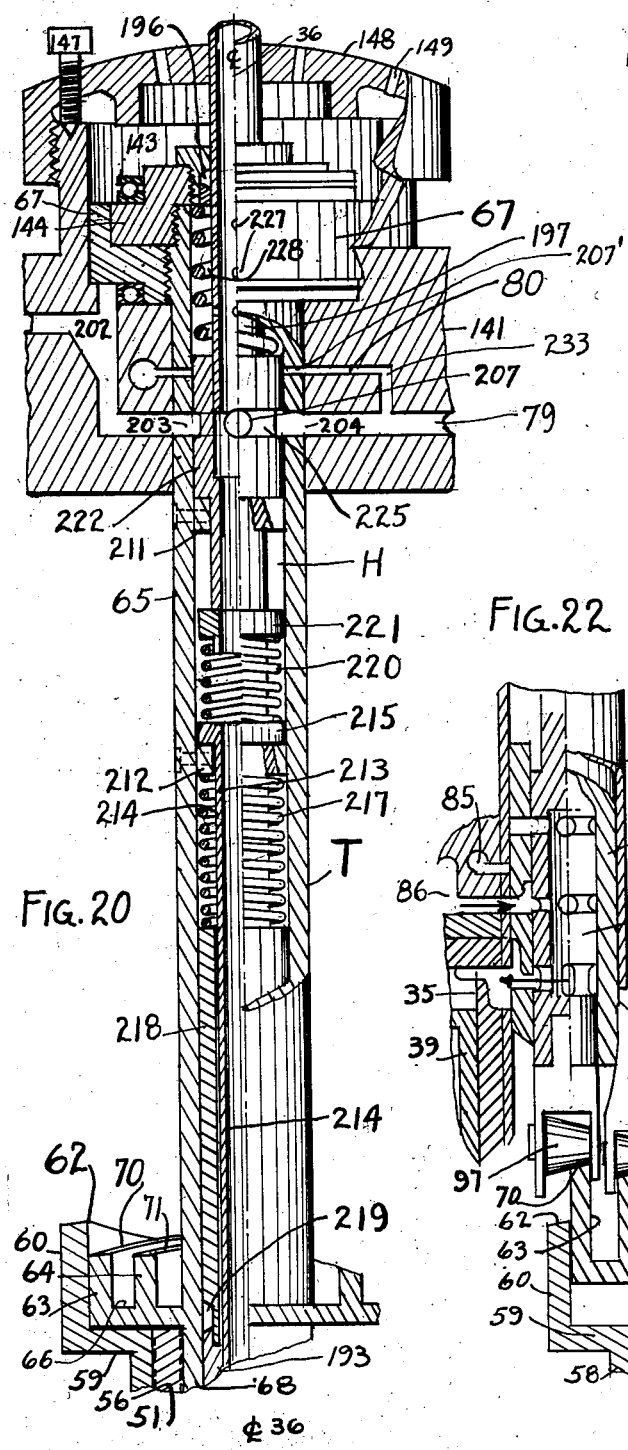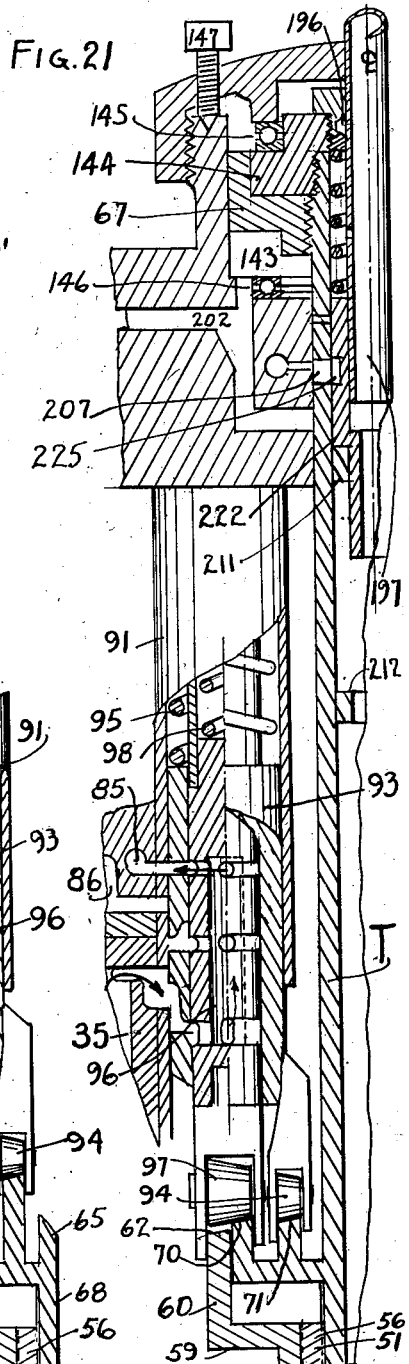

INVENTOR
Clarence A. Kelso.

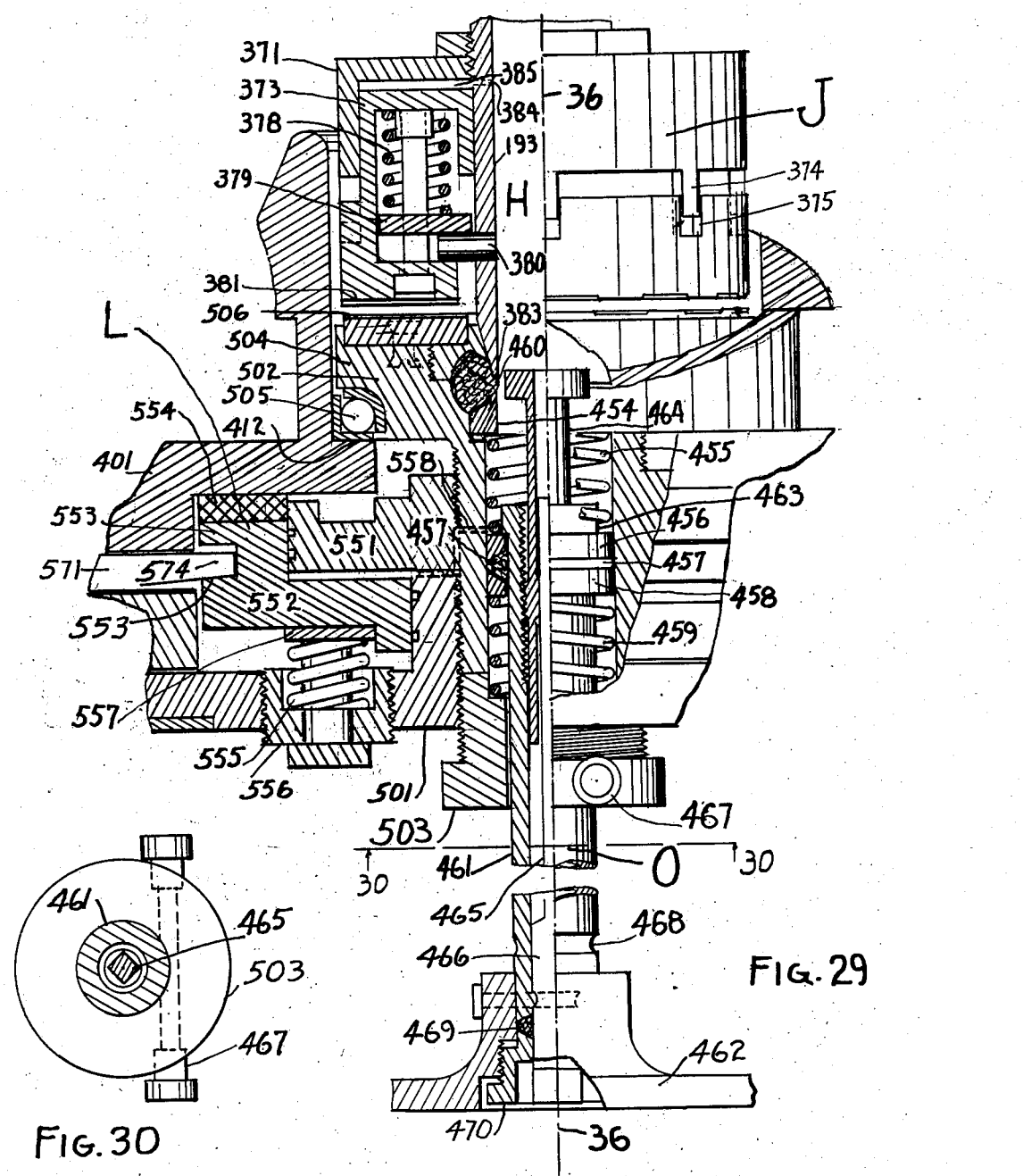

Patented Mar. 5, 1935

1,993,346

UNITED STATES PATENT OFFICE 1,993,346

AUTOMATIC GRABBING AND CARRYING DEVICE

Clarence A. Kelso, Los Angeles, Calif.

Application July 15, 1932, Serial No. 622,775

49 Claims. (Cl. 294—74)

My invention has to do mainly with the art of handling heavy or bulky things by means of cranes. The grabbing device comprises: a framed member or main support (preferably of circular or curved shape) normally carried by a crane; carriage mechanism adapted to travel along the periphery of said frame; flexible enveloping means the several elements thereof disposed as catenaries or festoons from the frame to the carriage means the whole thus forming a depending girdle or skirt below said supporting means; automatic brake mechanism to prevent unintentional movement of the carriage means relative to the frame; remote controllable motor mechanism; transmission means intermediate the motor and the frame; transmission means including an automatic releasing clutch intermediate the motor and carriage mechanism; selective means including remote controllable mechanism to release said brake; remote controllable means to operate the motor as predetermined either in forward or in reverse direction; remote controllable mechanism to engage said clutch. The invention also comprises: remote control means to effect the release of said brake; remote control means to effect the simultaneous release of the brake and the engagement of the clutch; remote control means to govern the operation of the motor. These instrumentalities are adapted to actuate a carrier unit comprising the aforesaid frame, carriage mechanism and flexible skirt as required under various circumstances to enclasp an object to be crane handled, to maintain hold of the object during crane operations and to effect unloading operations as follows: (a) to spin the carrier unit about its vertical axis thus to open by centrifugal forces the enveloping means preparatory to; (b) the grabbing operation which immediately occurs upon engaging the clutch to cause the carriage mechanism and corresponding legs of the festooned elements to rotate in opposition to the frame supported legs thereof to effect accumulative angular lead therebetween thus to constrict the girdle to inclasp an object; (c) to maintain a self-tightening grip of the enveloping means on the enclasped load; (d) to effect selective unloading operations including gravitational discharge of load from carrier. The motor is reversible operating faster and developing more torque in one direction than when operating in the other direction. Due to the fact that the enveloping unit operates the same in forward and in reverse directions this two speed two power feature of the motor permits of selective operation conformable to the nature of the objects handled and with the degree of care to be exercised in handling the same.

While I am aware that some of the above stated means can be omitted with corresponding decrease in the utility of the device, I have also provided supplemental means to be optionally incorporated in certain embodiments of my invention. These comprise: automatic signalling means to signify the completion of an effective hold of the device on the object to be crane handled; a portion of this signalling mechanism, in another phase of its operation, can be used as a feeler where the crane operator is working blindly; and mechanism is provided to coact with a portion of this signalling means to automatically stop the motor once the grabbing operation reaches a predetermined stage to prevent breakage or other injury to certain objects and also to save power.

I wish it to be understood that, insofar as I am informed, I consider my invention fundamentally novel in its entirety and novel in less combinations than in the whole of its component mechanisms.

While this specification and the drawings to which it refers sets forth my invention in embodiments adapted primarily to seize and to hold objects to be handled in the art of cranes I do not want to be so limited for I consider basic principles of the invention to apply to a broad class of mechanisms the function of which is to seize and/or to hold objects but in arts other than that of cranes and also to mechanisms the function of which is other than to seize or to hold objects.

In order to set forth the scope of my invention in the art of cranes I shall mention some of the things it is intended to handle and I shall also point out some of the conditions met with in handling such articles. The list of articles here given is intended to convey an idea of the variation in size, shape and character of the objects which can be handled in successive crane trips in various applications of my invention. This list includes: grain, potatoes and cement in sacks; baled goods; a cock of loose hay; sheaved grain in shock; boxes, cartons, crates; barrels and kegs; quarried stone or blocks; all sorts of objects having cylindrical or spheric form; fragile materials such as pottery, porcelain wares, cement or clay pipe; castings and machinery; submerged objects; hot castings or forgings; animals; etc.

In the various industries having to do with the production warehousing or transportation of things such as above enumerated there are inherent conditions peculiar to each which determine the size and shape of the parcels or of the crane loads, the nature of the packages or loads, the type of crane and its speed requirements and the degree of care to be exercised in handling the materials. In some cases the goods per se must not be injured and in other cases the container must not be torn or broken so the contents become lost. In some cases the successive crane loads are in every respect alike while in other instances the successive loads vary in size, shape or character. Within the physical limitations imposed by size and strength requirements, in a given embodiment of my device, the fundamental object of the invention is to provide self adjusting means capable of safely and economically handling various heavy or bulky articles regardless of the size or of the shape of the articles or of the nature thereof even where the successive loads may comprise a random assortment of such goods.

In the art of crane handling materials or objects such as premised present practice includes the use of a net, a sling or some sort of tongs which require considerable manual labor both in the loading and in the unloading operations. These and other types of such equipment are not adapted for general employment which necessitates frequent change of carrier at the expense of crane delay in making a crane trip cycle. In a broad sense one of the objects of my invention is to provide means adapted for self-attachment of carrier to load whereby to speed up crane operations in handling such articles.

Other objects of the invention have to do with the unloading operations incident to the handling of articles of the premised classification. In some cases it is necessary to lay the crane load down carefully on a floor, in other cases the successive loads are to be piled and in other cases the loads can be dropped from a suspended position. In some cases the crane operator can not see the site of the loading or of the unloading operations. The mention of these conditions is here intended to further indicate the scope of operations to be attained.

One of the objects of my invention is to provide means to automatically hold an article in its upright position while being crane handled.

It is desirable for the crane operator to be apprised that the attachment of carrier to the load is secure to prevent it from falling unintentionally. I have provided automatic signalling means for this purpose. Additionally I have provided means to maintain a self-tightening grip of the flexible envelope on the inclasped load.

There are cases where, for one reason or another, relative motion occurs between the crane and the article to be grabbed hold of and other cases where it is necessary to land the load on a support which is in motion relative to the crane. One of the objects of my invention is to provide positive quick acting means to handle articles such as premised under these conditions.

The art of crane handling heavy or bulky things under conditions such as cited involves the problem of remote control for the grabbing device itself. Especial attention is directed to the remote control means and to the remote controllable mechanism appertaining to this invention.

An application of the fundamental principles of my invention has to do with the remote controlled operation of raising sunken ships in which case the frame would be ship shape and of commensurate size and be suspended from a suitable barge equipped with the necessary hoisting apparatus.

While I have called my invention a grabbing device and the presumption is that it will be employed to grab hold of the object per se to be crane handled, I also have in mind other uses for it. These analogous uses include its employment to transfer boats and hydroplanes from ship's deck to the water and vice versa where such craft carry a small mast with a ball top which serves as a handle to be grasped hold of by the grabbing device.

A grabbing device such as herein disclosed when carried by a dirigible also can be used as an anchor to automatically grab hold of a mooring mast as well as for taking on and discharging cargo.

Other objects appear as the invention is more fully disclosed. I attain the objects of my invention by means of the instrumentalities illustrated in the accompanying drawings wherein similar parts are referred to by like characters of reference throughout.

*Brief description of drawings*

Figure 2 shows the enveloping means constricted in globated phase the device being empty. Figure 3 represents the device in operation as when the carrier unit is being spun about its vertical axis, the outward flung enveloping elements so positioned by centrifugal forces, this represents the spread phase. Figure 4 shows the device enclasping an object such as a bag of grain which represents one of its characteristic enveloping phases the variations of which are dependent upon the size, shape or character of the load.

Figure 6 is a view looking down on Fig. 5 at the plane indicated by 6—6 but the outer shell is here shown as broken away below the domed portion thereof so as to show a full plan view of the upper interior portion thereof.

Figure 7 is a diagrammatic representation of the piping and valve layout to control the pneumatic operation of the grabbing device.

Figure 8 is a fragmentary view of the portion immediately adjacent the vertical axis 36—36 of the device at the plane indicated by line 8—8 in Fig. 5.

Figure 9 is a fragmentary plan and sectional view taken on the stepped planes indicated by line 9—9 in Fig. 5 and in which certain exterior parts are broken away to expose interior construction.

Figure 10 is a horizontal two plane section taken on line 10—10 of Fig. 5.

Figure 11 is a fragmentary view taken at level of line 11—11 in Fig. 5 and shows in plan the cams for controlling the direct and reverse motions of the device.

Figure 12 is a side elevation of Fig. 11 and shows the cams in position for reversing the motion of the motor from that indicated in Fig. 5.

Figure 13 is a fragmentary detail showing means for adjusting the length of the elements of the enveloping means.

Figure 14 is a sectional plan view taken at the level of line 14—14 in Fig. 5 and shows the construction of the check valve A and the remote controlled valves B, and C, the receiver G and the arrangement of interiorly formed passageways through which air pressure is admitted to and exhausted from the motor.

Figure 15 is a fragmentary view of the grabbing device in a construction which is cheaper than that shown in Fig. 5. It is intended for those cases where low first cost is the determining factor rather than such considerations as speed of operation, flexibility of control, detachability of carrier, etc.

Figure 16 is a fragmentary view looking up on line 16—16 in Fig. 5.

Figure 17 is a fragmentary view showing in elevation a portion of an endless form of the enveloping means to be used for the inner leg portion of the festooned elements in lieu of the individual chain form shown in Figs. 1 and 5.

Figure 18 shows inlet phase and Fig. 19 shows exhaust phase.

Figure 20 is a fragmentary sectional view of the parts immediately adjacent the axis 36—36 in the upper and central portions of the motor unit M. In this view the remote controllable shifting means to govern the forward and reverse direction of motor operation and a portion of the signalling mechanism are shown. The phase position illustrated in Fig. 20 corresponds to direct motion of the motor.

Figure 21 is a fragmentary view showing the remote controllable shifting means in phase to govern the reverse operation of the motor and also shows one of the timing valves in exhaust phase in reverse motion of the motor.

Figure 22 is a fragmentary view of one of the timing valves for inlet phase reverse motion of the motor.

Figure 29 is a fragmentary view showing enlarged sections through the rotor brake L and the clutch J and also shows the tell-tale O and the construction pertaining to the draft tube H in the carrier N.

Figure 30 is a section view looking up on line 30—30 in Fig. 29.

DETAILED DESCRIPTION

*The crane*

Figure 1:
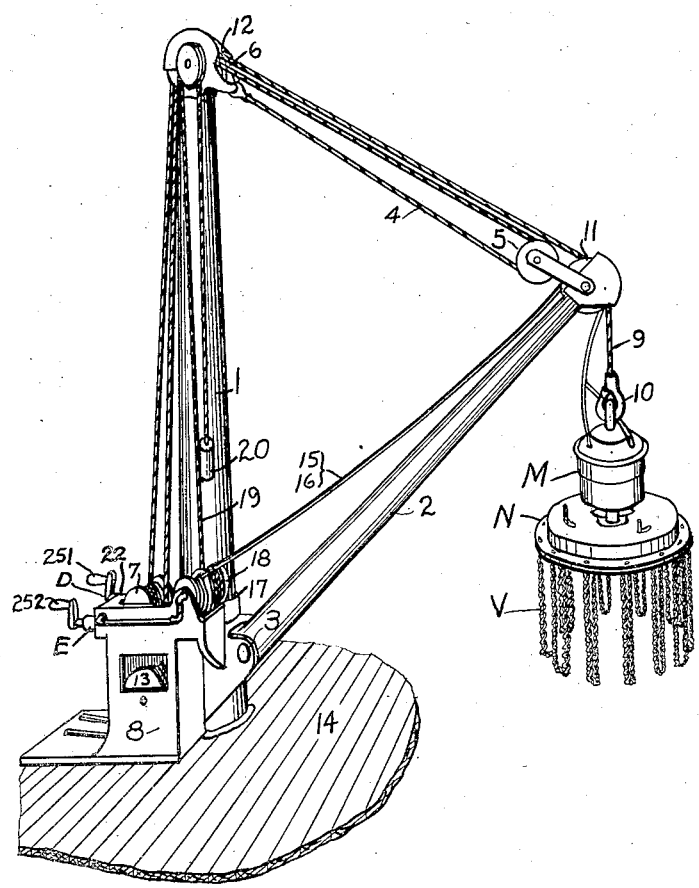
Figure 1 is a perspective view of a portion of a ship and shows a commonly used type of crane carrying a preferred embodiment of my grabbing device as suspended from the fall or load line thereof. In this view M indicates the motor assembly and N indicates the main supporting frame from which hang the festooned elements of the flexible enveloping means V as the elements appear in quiescent condition and in neutral phase.

The crane shown in Fig. 1 is one of a type commonly used on cargo carrying ships having a rotatable mast 1 a boom 2 pivoted at 3 and adjustably supported by the luffing line 4 rove over sheaves 5 and 6 and wound on drum 7 of the hoist 8. My grabbing device comprising the motor assembly M and depending carrier unit N is carried on the load line 9 by means of a safety hook 10 and the load line is rove over sheaves 11 and 12 thence to the lifting drum 13 of the hoist 8. The grabbing device so positioned is operated by compressed air supplied thereto through hose 15 and 16 and controlled by valves D, E and F of the control stand shown in Figs. 1 and 7. In order to prevent the air hose from becoming entangled with the load line the hose is wound on the drum 17 carrying a winding spool 18 on which the cable 19 is wound so as to raise or lower the weight 20 as the grabbing device is moved by the hoist. By means of this equipment the crane operator can position the grabbing device at any point within reach of the crane and control its vertical position with respect to ship's deck 14.

The word crane as used herein is intended as applying to all types of structures provided with hoisting means and carrying a load line or a movable arm to which the grabbing device may be attached the specific form thereof being immaterial to the invention.

*Air supply and control means*

Referring to Fig. 7 the numeral 23 indicates an air compressor adapted to supply moderately high pressure air via the pipe 24 to the primary storage tank 241 from which the pipes 242 and 243 lead to valves D and E of the control stand indicated by 22 in Fig. 1 where these valves have handled cranks 251 and 252 for manual operation. The valves D and E are alike and are of the rotary plug core type, the view of Fig. 7 showing sections therethrough. These valves are cross connected by a pipe 244 through which low pressure air via the pressure reducing valve F can be by-passed through either valve D or E when the core is positioned as shown. By turning the core of these valves to other obvious positions the valves can be independently operated to deliver the full high pressure air through the corresponding hose 15 and 16. By the obvious operation of valves D and E together with the operation of the corresponding relief cock 248 or 249 the pressure can be relieved from the hose. Valve D is connected via the hose 15 to nipple 200 on the grabbing device and valve E is connected via hose 16 to nipple 199 of the grabber, see Figs. 5, 6 and 14. The hose 16 is connected via the pipes 247 and 256 to the back pressure gage 257. The function and operation of the valves D, E and F and of the gage 257 is hereinafter set forth.

*The motor*

Figure 5:
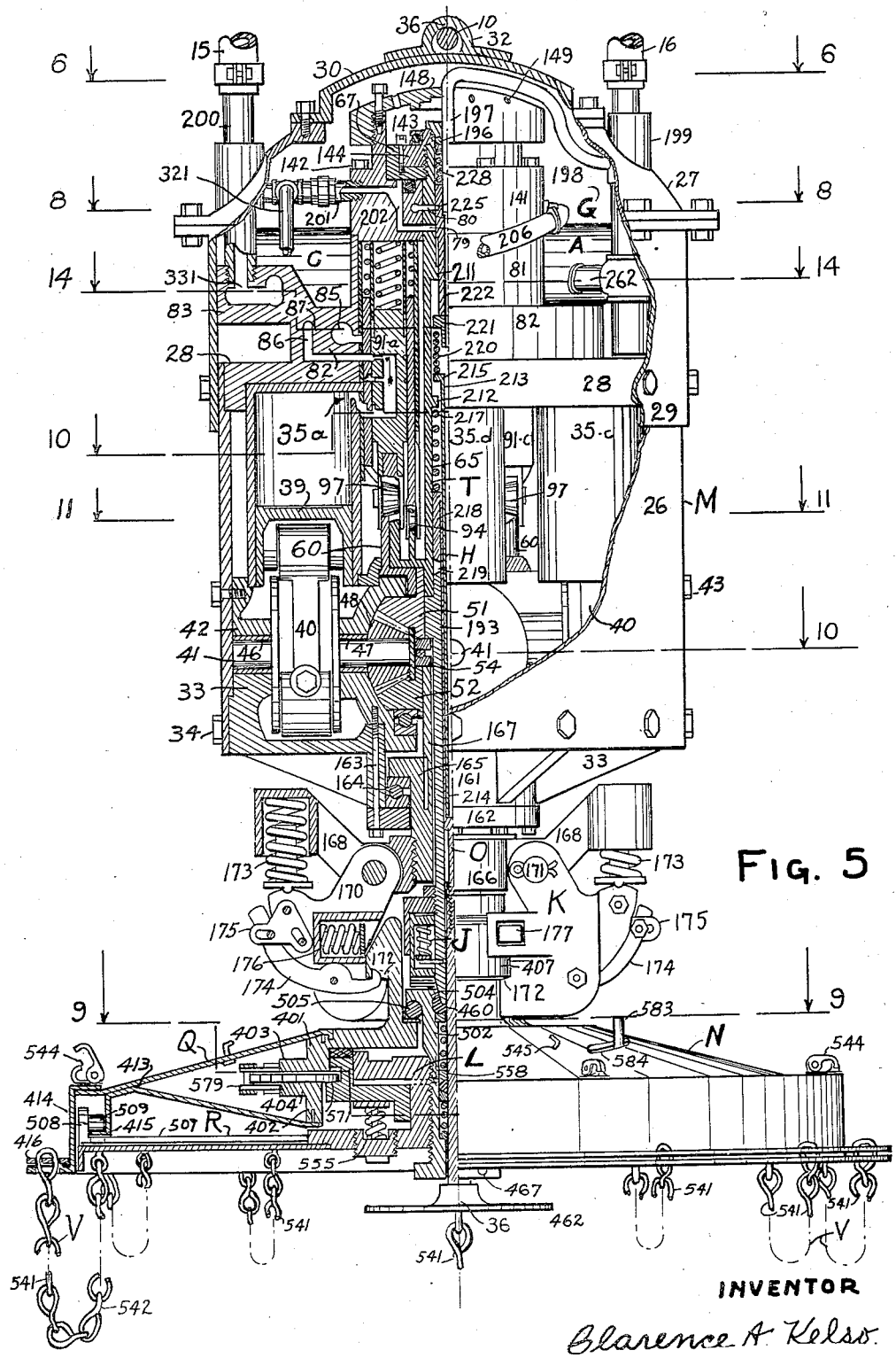
Figure 5 is a combined vertical section and elevation of my grabbing device taken on line 5—5 as shown in Figs. 6 and 10 and in which certain exterior and intermediate parts are broken away to show interior parts. In this view there are three principal vertically disposed and clearly defined portions of the invention comprising the motor assembly M, the suspender and positive clutch mechanism K and a detachable carrier unit N.
Figure 18:
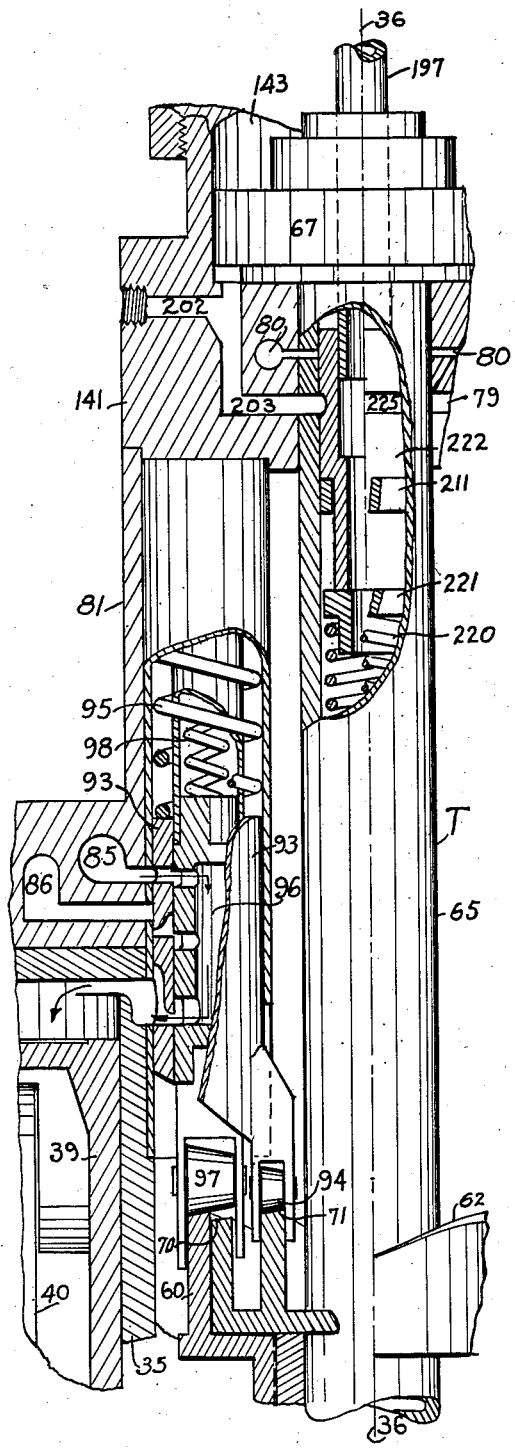
Figures 18 and 19 are fragmentary sectional views showing phase positions of the cam and timing valve mechanism for controlling air pressure to one cylinder of the multiple cylinder motor to run the motor in direct or forward motion.
Figure 19:
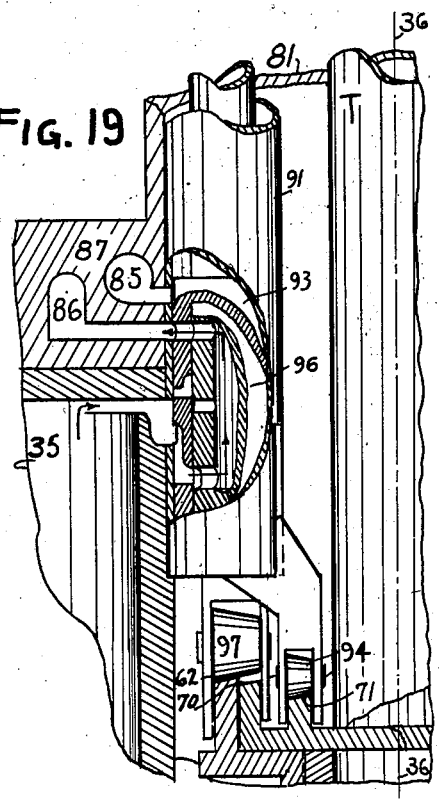

Referring to Fig. 5 the motor unit M has an outer shell consisting of two cylinders 26 and 29 and a two part domed member 27 and 30. Where the cylinders 26 and 29 join is an interior diaphragm 28. These members are secured together to form an air tight compartment or secondary storage tank above the diaphragm 28 which is herein called the receiver G more particularly referred to hereinafter. The bail 32 on the dome cover 30 is adapted to engage the hook 10 by which means the grabbing device can be carried by the crane as shown in Fig. 1. At the lower end of the shell 26 is a bracketed casting 33 comprising the lower member of the motor frame and also serving as a supporting member for the mechanism K hereinafter described. This casting 33 and its companion stop member 42 are secured to the shell 26 by means of bolts 34 and 43 respectively and are bolted together as shown at 44 and 45 (Fig. 10). Centrally located within the domed shell 27 is a cylindrical casting or valve block 81 (Figs. 5 and 14) having a compositely formed bottom flange 82 and 83 membering with the diaphragm 28. Within this two member flange there are two concentrically formed grooves which are hereinafter referred to as header passageway 85 and header passageway 86 respectively the same separated by a wall 87. The outer flange member 83 (see Fig. 6) carries three radically positioned cylinders or shells for the check valve A and the remote controllable valves B and C more particularly described hereinafter. The valve block 81 has an upper companion member or head block 141 (Figs. 5 and 6) secured thereto by bolts 142 and in which is formed a piston chamber 143 having a cylinder head 148.

Housed in and between the diaphragm 28 and the upper frame member 42 are four motor cylinders 35a, 35b, 35c and 35d which are alike but the suffixed characters indicating position in clockwise order around the vertical axis 36—36 of the grabbing device as shown in Figs. 5 and 10. The axes of these cylinders are parallel to the axis 36—36 and are disposed oppositely in pairs on the diameters spaced angularly apart as indicated by the arrowed lines 37 and 38 to which further reference is made hereinafter. Each cylinder has a piston 39 therein with crank 40 connecting the piston to an individual crankshaft 41 which is radically positioned with reference to axis 36. Each crankshaft is journaled in the motor frame as indicated at 46 and 47 and carries a bevel pinion 48 secured thereto by a key 49. Thus in the construction illustrated there are four pinions 48 which cooperate to simultaneously drive a top gear 51 in one direction and a bottom gear 52 in the opposite direction and these driving and driven elements are housed in the central cavity 53 of the two part motor frame 33 and 42.

Journaled in the frame 42 and keyed on the hub 56 of gear 51 is an integrally formed cup shape member consisting of an annular base 59 a cylinder 60 upstanding on outer edge of 59 and a hub 58 depending from the inner edge of 59. Slidable in the bore of the cylinder 60 (Fig. 20) is a shifting member T consisting of three concentric cylinders spaced apart radially and integrally formed on an annular base 66. The outer cylinder 63 and the intermediate cylinder 64 both upstand on the base 66 but the inside cylinder has a hub 68 depending from the base and a long upstanding portion which is hereinafter referred to as piston rod 65. This piston rod 65 is slidable and rotatable in the bottom bore of the previously described head block 141 and carries at its upper end a piston 67 adapted to be forced up and down by compressed air acting in the aforesaid chamber 143 as will be hereinafter explained. The hub 68 of T is slidably dovetailed in the upper hub 56 of the gear 51.

The upper edges of cylinders 60, 63 and 64 are bevelled and serrated to form cams which are hereinafter referred to as direct cam 62; reversing cam 70 and sleeve operating cam 71 respectively; (See Fig. 11 and Fig. 20.) Due to the splined connection of the respective cylinders for these cams with gear 51 they are permanently held in fixed radial alignment and will be compulsorily rotated as and by that gear although the cams 70 and 71 can be moved axially with respect to cam 62 as governed by the stroke of the piston 67 from the lower position shown in Figs. 5, 18, 19 and 20 to the upper position shown in Figs. 12, 21 and 22.

As shown in Figs. 10 and 14 the hollow piston rod 65 of the shifting member T is centrally positioned in the valve block 81 and positioned therearound in same diametrical planes as the cylinders 35 are four timing valves 91a, 91b, 91c and 91d which are alike but the suffixed letters indicating positions corresponding with those of the respective cylinders. In Fig. 5 the valve 91a is shown in phase to exhaust the air from cylinder 35a in direct motion and in Fig. 19 one of the valves is shown in same phase as in Fig. 5 while in Fig. 18 the direct motion intake phase is indicated. Figs. 21 and 22 show reverse motion exhaust phase and intake phase respectively.

The timing valves 91 comprise a sleeve 93 a hollow plunger 96 in the sleeve a spring 95 to hold the sleeve follower 94 on the cam 71 and a spring 98 to hold the plunger follower 97 on either the direct or reverse cam depending upon the position of piston 67 in cylinder 143 which position of piston is governed by the operation of control valve D. In the various drawings showing these valves the extreme phase positions of plunger and sleeve are shown and the arrows indicate the course of the air therethrough which is hereinafter explained in connection with valves B and C.

The construction of the timing valve and cam mechanism is such that the cam 70 will be below cam 62 when the piston 67 is at its lower position and that cam 70 will be above cam 62 when the piston is at its highest position. The roller 97 is of such radial length that it spans both the direct and reversing cams. Consequently when the piston 67 is down as shown in Figs. 5 and 20 the reversing cam is inoperative and when the piston is up as in Figs. 21 and 22 the direct cam is inoperative. The reciprocal movement and the dwell periods of the plunger 96 are governed by the cooperative operation of the follower 97 on cam 62 or on cam 70 as desired and the reciprocal movement and dwell periods of the sleeve 93 are governed by contact of follower 94 on cam 71 all of which movements are controlled by the operation of valve D as will hereinafter appear.

*Valve timing and directional control for remote controlled motor*

In Fig. 11 the radial lines across the three cam faces indicate the limits of the oppositely inclined slopes and of the dwells intermediate these slopes. Depending upon the arc length and angular positions of these slopes and dwells the sleeve 93 and the plunger 96 can be made to travel in the same direction, to dwell together or to travel in opposite directions so as to position the circumferential grooves of the plunger and the ports of the sleeve to control the intake and exhaust phases of the valves in any desired range of time intervals. In Fig. 11 the subscript (a) represents the upper dwell, (b) the lower dwell, (d) the down slope and (u) the up slope on the several cams.

In the construction illustrated the gears 51 and 52 have twice as many teeth as the pinions 48 so that one cycle of reciprocal motion of the pistons 39 will cause these gears to turn one half revolution in their respective opposite directions to effect exactly one revolution or 360 degrees angular change between corresponding points on the gears. In the view of Fig. 11 it will be seen that each of the three cams is double so that there are two cam cycles per revolution of gear 51.

Depending on speed and strength requirements in the various cases I shall use either one of two methods or a combination of them to prevent dead centering of the motor and to cause it to run in a given direction as desired. For a given phase position of the timing valve and coacting cams one of these ways is dependent upon the advance position of cranks 40 as the pinions 48 and gear 51 are assembled for by advancing the angular position of the crankshafts in alternately placed cylinders the distance represented by a fractional part of the pitch of pinion teeth or by one or more teeth dead centering of the motor can be avoided and considerable latitude obtained as to the opening and closing of the valves.

The other way to avoid dead centering depends upon the angular location of alternate pairs of the cylinders and valves as indicated by the arrowed lines 37 and 38 in Fig. 10. The pinions 48 will mesh properly with the gears 51 and 52 at any radial position around the axis 36—36 so that as alternately positioned valves 91 are located slightly less than and farther apart than 90 degrees the time interval in which the respective cams will operate the corresponding valves can be varied to prevent dead centering of the motor and, for a given valve phase setting, the positive direction of rotation can be predetermined.

In this specification the term direct motion is meant to apply to that direction of motion of any operative part in which the upper gear 51 turns in clockwise direction when viewed from above and reverse motion means the opposite of direct motion.

While the drawings show four separate cylinders and corresponding coactive parts as comprising the motor unit I do not wish to be so restricted. The novel principles here disclosed apply to the motor whether it has one or a plurality of cylinders. The necessary relation is that the number of cam cycles per revolution of driven elements be the same as the gear ratio of gear to pinion or that the number of cam cycles per revolution be divisor of the gear ratio. It will appear further on in this disclosure that the operation of the enveloping means requires unusual motor performance, the novelty of which is pointed out hereinafter.

Carrier suspender and clutch "K"

Referring to the motor frame member 33, (Fig. 5) it has a depending collar 161 carrying an annular flange 162 secured thereto by bolts 163. This flange 162 is a seat for the bearing 164 on which is carried the cylindrical flanged hanger 165 which adjustably carries the collared yoke 166. Dovetailed in the upper end of the hanger 165 is a hollow shaft 167 the upper end of which is splined in the lower gear 52 which arrangement will cause the yoke 166 to be rotated as and by the driven element 52.

The yoke 166 has a pair of oppositely positioned arms 168—168 each carrying a latch 170 adapted to be rotated inward about its pivotal support 171 by means of a spring 173. The latches 170 have castellated lips 172 adapted to support and engage for unitary rotation therewith the hub head 407 of the carrier unit N hereinafter described. To prevent the unintentional disengagement of carrier N from the motor assembly M each latch 170 pivotally carries a safety catch 174 the outer end of which engages a toggle or rocker arm 175 cooperating with a spring actuated releasing member 176 extending radially inward (with respect to the said axis 36—36) and carrying an arm 177 projecting out through the latch 170 as shown in the right side of Fig. 5. The inner end of the safety catch engages in the groove 410 of the hub head 407 (Fig. 16) and the arrangement of latches and safety catches thus affords positive engagement of carrier N to motor assembly M although the carrier is detachable.

Draft tube parts

Between the gears 51 and 52 is a bearing 54 which supports a hollow shaft 193 which is splined in the hub of gear 51 and slidably engages the lower end of the piston rod 65. This shaft 193 extends down through and is rotatable in the bore of the members 165 and 167 and, as shown in Fig. 29, makes contact in the resilient packing 460 with the hollow hanger 502. The contiguous bore of the three hollow members 65, 193 and 502 is herein referred to as the draft tube H. The draft tube is connected via the pipe 198 to the inlet pipe 199 so that air pressure as controlled by valve E can be maintained therein or relieved therefrom as required.

In the bore of the piston rod 65 is an annular ledge 211 (see Figs. 5 and 20) which serves to reduce the bore of the draft tube at that point and also forms a stop for the sliding sleeve 222. This sleeve 222 functions as a piston in the bore of 65 and in the reduced bore of stop 211 and has a circumferential groove 225 for a purpose hereinafter set forth. The pipe 198 terminates in a nipple 197 extending through the piston 67 and into the upper end of 222. In the piston nut 144 is a packing ring 196 which is compressed by the spring 228 seated on the sleeve 222 which arrangement forms a self adjusting packing gland to close off the upper end of the draft tube.

Below the stop 211 is another one 212 under which, in order, is a spring 217 a follower 218 and a packing ring 219 seated on the upper end of the hollow shaft 193 the whole forming a self-adjusting packing gland to prevent escape of air from the draft tube at the juncture of the shaft 193 and the shifting member T.

By referring to Figs. 5, 6, 8 and 20 it will be noted that inlet pipe 200 is connected via the pipe 201 with an interiorly formed passageway 202 in the head block 141 which leads directly to the operating chamber 143 underneath the piston 67. This passageway 202 also extends downward in the block thence radially inward where it is enlarged to form a port 203 opening to the bore in the block 141 for the piston rod 65. Diametrically opposite the port 203 is a similar one 204 communicating outward via the duct 205 and pipe 206 leading to the operating chamber 303 of valve B.

In the wall of piston rod 65 there are four ports 207 at right angles to each other and at such distance below the piston 67 as to communicate with block ports 203 and 204 when the piston 67 is at its lower position in cylinder 143. In the view of Fig. 5 the sleeve 222 inside of the member 65 is shown as obstructing this passageway through the block 141 while in Fig. 20 the sleeve 222 is shown in its lower position so that its circumferential groove 225 completes this passageway which is hereinafter referred to as block passageway 79.

Referring to Fig. 20 it will be seen that there is another passageway through the block 141 just above 79 which is connected to 79 by the vertical passageway 233. On the left hand side this passageway is connected upward to the pipe 234 (as shown in Fig. 6) which extends outward through the shell 27 where it is open to the atmosphere. In the wall of the piston rod 65 are holes 207' similar to the holes 207 so the view of Fig. 8 applies thereto. When the sleeve 222 is raised up as shown in Fig. 5 its groove 225 completes this passageway which is herein referred to as relief duct 80 the function of which will appear.

Immediately under the stop 211 is an annular collar 221 riding on the spring 220 in turn supported on the top flange 215 of the push rod 213. This push rod has a long depending hollow stem 214 which extends downward through the spring 217 and follower 218 to make contact with the hereinafter described telltale O when the latter is forced up in the draft tube as will appear. The collar 221 engages the lower end of the sleeve 222 and the stop 211 thus serves to limit the upward movement of the sleeve 222 and the push rod 213 and the stop 212 serves to arrest the downward movement of the push rod 213 the views of Figs. 5 and 20 showing these extreme positions of the same. The spring 228 above the sleeve 222 is stronger than the spring 220 under the collar 221 and the sleeve 222 so that the normal position of the sleeve is as shown in Fig. 20.

In the wall of the nipple 197 are holes 227 so that the air can flow from the draft tube H into that annular space within the bore of the piston rod 65 above the sleeve 222. When the sleeve 222 has been raised up by the push rod 213 as shown in Fig. 5 it can be forced down by admitting low pressure air in the draft tube thus fully compressing the spring 220, the push rod remaining in its higher position as shown in Fig. 5.

The explanation of the operation of these draft tube parts is set forth in connection with the description of valves B and C and in the explanation of the operation of the invention.

Remote controlled clutch—J

The hollow shaft 193 (see Fig. 29) adjustably carries an inverted cup cylinder 371 which is adapted for unitary rotation therewith. The driven member 506 of this clutch is a part of the detachable carrier N. The active member of this clutch comprises an annular piston 373 which is slidably splined to the cylinder 371 as shown at 374 and 375, and carries the clutch plate 381. A plurality of springs 378 supported on the washer 379 engaging pins 380 in the wall of the shaft 193 are thus adapted to hold the active clutch member in its disengaged position but when high pressure air is in the draft tube the piston 373 will be forced down to engage the clutch for suitable ports 384 are formed in the wall of the shaft 193 so that the chamber 385 above the piston 373 is always subjected to the same pressure as in the draft tube. The springs 378 are of such strength that the clutch will remain disengaged except when the pressure in draft tube is of greater intensity than that via the valve F.

The carrier unit—N

The carrier unit N as shown in Fig. 5 is detachable from the main support or motor assembly M. It has a compositely formed hub provided with an upstanding portion 407 which is adapted to be engaged by the latches 170 of the suspender mechanism K the view of Fig. 16 showing the groove 410 and the castellated collar 411 under the head 408. The hub members 401 and 402 are rigidly secured together by bolts 405 through their flanges 403 and 404 and carry a circular frame 413. This frame 413 comprising the main support of the carrier N carries a flanged rim 414 and an endless track 415. The flexible enveloping means V, to which reference has previously been made, comprise a depending girdle or skirt the several elements of which are disposed as catenaries or festoons carried by the frame. The outer legs of these festooned elements are secured at equally spaced circumferential points to the rim 414 and the inner legs are carried on equally spaced carriages 508 having rollers 509 adapted to roll on the endless track 415. The carriages 508 are secured to a spider or actuating means 507 which has a hub 501 adjustably supported on the hollow cylindrical hanger 502. This hanger 502 has an inside and outside projecting top flange 504 the outer flange resting on the bearing 505 seated on the ledge 412 in the upper hub member 401. Collared on and secured to the flange 504 is an annular clutch plate 506 corresponding to the one 381 of the previously described pneumatic clutch J. From the above described disposition of the two part hub 401 and 402 the frame 413 and the track 415 it will be seen that these parts comprise a unit which, by reason of the positive engagement of the suspender mechanism K, will be motor driven as and by the lower gear 52. This driven unit is herein referred to specifically as the upper rotor Q. Likewise from the above described disposition of the carriages 508, spider 507, hub 501 and hanger 502 it will be seen that these parts comprise a carriage mechanism which, by means of the clutch J, is adapted to be driven as and by the upper gear 51 when the clutch is engaged. This carriage mechanism is herein referred to specifically as the lower rotor R.

The elements of the enveloping means or skirt as shown in Figs. 1 and 5 are chains 541 having links 542. In the view of Figs. 5 and 13 these chains are shown as having the end link of the outer leg thereof straddling the tongues 418 of the floating collar 416. The inner leg of these chains is secured to the carriage mechanism by means of eye bolts 543.

The length of the festooned portion of the several flexible elements can be adjusted (shortened from that shown in the drawings) in either of two ways. One of these ways provides for unitary adjustment and can be performed by rotating the floating collar 416 on the rotor Q to pull the elements up through the flange holes 417 and thereby winding them on the cylindrical member 414 of the rotor Q. The other way is to pull each element up through the rotor flange and then fasten the end on the cleat 544 or on the bent pin 545 depending upon the amount of shortening required.

Rotor brake—L

The two rotors as shown in Figs. 5 and 9 are adapted to be automatically locked together to prevent unintentional rotation of one with respect to the other by means of the spring actuated brake L, which is shown in the enlarged view of Fig. 29. In the drawings 551 is an annular flange on the hanger 502 and 552 is an annular cup shape piston the larger bore thereof conforming to the exterior of the flange 551 and the smaller bore thereof conforming to the barrel of the hub 501 and adapted to slide and rotate thereon. The piston 552 has an exterior top flange 553 carrying a ring of brake lining 554 which is adapted to frictionally engage the upper rotor hub 401 because of the continuous thrust of a plurality of springs 555. These springs 555 are adjustably supported in the screw caps 556 threaded to the hub 501 and carry a studded ring 557 adapted to frictionally engage the piston 552. The annular space between the flange 551 and the piston 552 is connected via the holes 558 through the hub 501 and hanger 502 directly with the draft tube H. The construction of the brake mechanism L is such that low pressure air in the draft tube will depress the piston 552 to free the lower rotor so that it can be easily turned with respect to the upper rotor. The construction of the clutch J, however, is such that it requires high pressure air in the draft tube to operate it to force its clutch parts into engaging position. Hence with low pressure air in the draft tube the brake L can be released without effecting the clutch J, but when high pressure air is in the draft tube the clutch J will be engaged and the brake L will be released.

The brake L can also be retracted to free the rotors by means of the hereinafter described tripping device "P".

Tripping device—P

Housed in the flange 404 of the upper rotor hub 402 are six equally spaced sprockets 571 journaled on bolts 572. These discs 571 have the sprocket teeth 573 formed but part way around leaving a portion thereof which is shaped to form double ended arcuate wedges 574 engaging the piston flange 553 (see Fig. 29).

The discs are encompassed by the endless chain 579 in which are three bar links 580, 581 and 582 each having a pin 583 projecting upward through a slot 584 in the frame 413. When either of the pins 583 is pulled lengthwise in the slot 584 the arcuate wedges will roll about their pivotal supports and force the piston 552 down to compress the springs 555 and free the rotors. But these wedges will automatically return to the position in Figs. 5 and 9 due to the combined effect of the springs 555 and one or the other of the springs 585 or 586 as but one of them will be stretched depending upon the direction of rotation of the endless chain.

Draft tube parts in the carrier—N

Referring to Figs. 5 and 29 it will be observed that the hanger 502 of the lower rotor forms an extension of the draft tube in the detachable carrier N. In order to prevent escape of air pressure from the draft tube at the junction of carrier with the conical nib 383 of the shaft 193 and also to prevent its escape downward around the tell-tale O. I have provided packing glands as follows: Underneath the inner top flange of the hanger 502 is an annular gasket 460 forming a resilient cushion for the nib 383 and below this gasket is a gland follower 454 a coiled spring 455 a follower 456 a packing ring 457 a follower 458 a spring 459 all of which are compulsorily retained and adapted to be forced upward in 502 by means of the bushing lock nut 503 which is screwed in the bottom hub 501 and against the end of the hanger 502. By means of the threaded connection of the lower rotor hub 501 on the hanger 502 and the lock nut 503 the vertical position of the lower rotor with respect to the upper rotor can be adjusted so that, with the device unloaded, the rollers 509 do not contact the track 415. This for the purpose of reducing friction when operating in spread phase.

The tell-tale—O

Projecting upward through the packing gland 457 into the draft tube the tubular stem 461 of the tell-tale operates as a displacement plunger adapted to be thrust downward when air pressure is admitted in the draft tube but capable of being forced up by exterior forces as represented by the arrow 471 in Fig. 5. The stem 461 carries a disc 462 at its lower end and has a flange 463 at its upper end which serves as a stop when in contact with the packing follower 456 to limit its downward movement. Threaded in the upper end of the plunger 461 is a lengthening rod 464 engaged interiorly on the square shank 465 of a non-rising adjusting stem 466 so the over all length of the tell-tale can be adjusted as required. The tell-tale can be held in its retracted position shown in full lines (Fig. 5) by means of the turn bolt 467 adapted to engage the circumferential groove 468 of the stem 461. Immediately above the plunger 461 is the previously described push rod 213 adapted to engage the valve sleeve 222 so that when the tell-tale is fully retracted by a force represented by the arrowed line 471 in Fig. 5 the valve 222 will be raised from its normal position shown in Fig. 20 to that shown in Fig. 5 to obstruct the passageway 79 all of which is hereinafter more fully set forth.

Check-valve—A

Referring to Fig. 14 valve A has a shell 265 a removable cage 267 and a plunger 273 a spring 278 bearing on the low pressure end of the plunger, a bushing 268 and a plug nut 279, the construction and disposition of which are clearly shown. High pressure air as controlled by valve E enters the high pressure chamber 264 of valve A via the pipes 199 and 262, thus forcing the plunger 273 out to compress the spring 278 to position the circumferential plunger groove 277 opposite the cage aperture 276 in which position the air can flow through the plunger and enter receiver G until such time as the unit pressure in G acting on the outer end of 273 together with the thrust of the spring 278 is sufficient to check the inflow when the valve will close as it is shown in Fig. 14. Consequently the maximum pressure in G will be less than the full high pressure in tank 241 and depends upon the mechanical advantage ratio of the pressure areas of the plunger 273.

By referring to Figs. 5 and 20 it will be seen that the pressure area of the top of piston 67 is considerably greater than the bottom pressure area thereof. It also will be seen that the timing valve springs 95 and 98 also tend to force the piston 67 down. In the cylinder head 148 there are holes 149 so the air pressure in receiver G is always acting above piston 67 consequently the piston 67 can not be raised up by air pressure underneath it except that it be of higher unit intensity than in G. For reasons which will appear farther on in this disclosure valve A is proportioned to have mechanical advantage ratio about the same as the piston 67 so the maximum unit pressure in G will be intermediate the high pressure as in tank 241 and the low pressure via valve F.

Remote control valve—B

The shell for valves B and C is indicated by 291 in Fig. 14. It is carried on the outer flange member 83 of the valve block 81. A bushing nut 292 holds the cage 293 in its place in the shell 291 and a plug nut 294 screwed in the member 292 is adapted to adjustably limit the outermost position of the operating member or valve plunger 295 in the bore of the cage 293 as the plunger 295 is thrust outward by the spring 296 seated in the radial bore of the block 81 behind the plunger.

In the shell 291 is an elongated passageway 298 communicating through the side of cage 293 with the operating chamber 303 at the outer end of the operating member 294. The plunger 295 has two circumferential grooves spaced apart and indicated by 306 and 307. In the cage 293 are two pairs of interiorly formed grooves encompassing the plunger 295. Beginning at the inner end the groove 308 communicates downward through the cage with the aforesaid header passageway 85 and the companion groove 309 communicates upward through the cage and shell via the port 310 (see Fig. 6) directly with receiver G. Of the outer pair of grooves the one designated by 311 communicates via a side port 312 in the cage and downward therethrough with the aforesaid header passageway 86 and its companion groove 313 communicates outward through the cage and shell via passageway 314 and pipe 315 thence through the shell 27 where it is open to the atmosphere at point 316.

The spring 296 is thus adapted to continuously exert pressure on the plunger 295 to force it outward to close the valve B but when there is sufficient air pressure in the chamber 303 the operating member 295 will be forced inward to compress the spring 296 and to thus open valve B as it is shown in Fig. 14.

The function of valve B is to control the direct motion of the motor. The manner of operating it depends upon whether or not the tell-tale O is operative which is optional and largely dependent upon the class of goods then being handled. The construction and operation of the tell-tale is explained under appropriate heading so it will suffice here to say that when the grabbing device is unloaded and ready to grab hold of an object the sleeve 222 will be in its lower position as shown in Fig. 20. With the tank G fully pressured and control valve D turned as in Fig. 7 to pass low pressure air the pistoned shifting member T also will be in its lower position as shown in Figs. 5 and 20. Hence with the concurrence of the above stated conditions, the low pressure air via valves D and F will pass through the lower block passageway 79 and enter the operating chamber 303 of valve B to open it as shown in Fig. 14. When valve B is open the air pressure from the receiver G will enter the shell port 310 thence pass around the plunger 295 via its groove 306 and into the header passageway 85 thence through the timing valves 91 when they are in the phase shown in Fig. 18 and into the respective motor cylinder 35 to force the piston 39 downward. On the upstroke of the piston 39 the air will be expelled from the cylinder 35 via the timing valve 91 when in the phase shown in Fig. 19 thence into the header groove 86 from where it passes upward and around the valve plunger 295 via the groove 307 thence via the pipe 315 to be discharged into the atmosphere.

In constructions omitting the tell-tale signaling means and for those cases where it is employed but made inoperative temporarily due to the class of goods then being handled the air to operate valve B is made to flow through another duct now to be described, in lieu of the passageway 79. Referring to Figs. 6 and 14 a plug core valve 322 is located in the by-pass pipe 321 connected between the pipe 201 and the passageway 298 leading to the chamber 303 of valve B. This valve 322 has a stem 324 projecting through the shell 27 and can be operated with a suitable key or wrench.

From the foregoing description of valve B and of the valve shifting member T and coactive parts it should be apparent that valve B can be operated only by means of low pressure air.

*Remote control valve—C*

The function of the valve C is to control the reverse motion of the motor. Inasmuch as the construction of valve C is somewhat similar to B the description here given covers only those parts which are essentially different. The lower end of the pipe 200 is screwed into the shell 291 where it communicates directly with passageway 331 leading to the cage passageway 332 which has two branches the outer one leading to the operating chamber 333 the inner branch leading through the cage 334 and there communicates directly with the innermost annular groove 335 in the cage. The companion cage groove 336 communicates downward with the header groove 86. The outermost cage groove 337 leads outward through the shell 291 via the passageway 338 and pipe 339 thence outward through the domed shell 27 where it is open to the atmosphere at 340. The companion cage groove 341 communicates outward through the shell 291 thence via pipe 342 communicates directly with the header groove 85. The operating member or plunger 343 has two exterior grooves 344 and 345. Between the inner end of the plunger 343 and the block 81 is a spring 346 in the inner chamber 347 and this chamber 347 is continuously subjected to G pressure via an aperture 348 extending upward through the block 81 as shown in Fig. 6.

The plunger 343 thus will be continuously subjected to the outward thrust of the spring 346 plus the air pressure in the chamber 347 at the intensity of pressure as in the receiver G.

Valve C thus can be opened only by admitting high pressure air as controlled by valve D to the outer operating chamber 333 which will force the plunger 343 inward to allow the air via hose 15 and pipe 200 to pass via cage groove 335, plunger groove 345, cage groove 336 thence into the header groove 86 thence via the timing valves 91 when in the phase indicated in Fig. 22 thence to the respective motor cylinders 35 to operate the pistons 39 in reverse phase direction because the piston 67 will be raised by the high pressure air thereunder thereby making the reversing cam 70 operative.

On the upstroke of the piston 39 the air will be expelled from the cylinder 35 via the timing valve 91 when in phase as shown in Fig. 21 thence into the header groove 85 and outward therefrom via pipe 342 thence around the plunger via groove 344 and outward therefrom via pipe 339 where it will be exhausted at point 340.

Because the motors are run on low pressure air in direct motion and on high pressure in reverse it follows, other things being equal, that the speed of reverse motion will be greater than that for direct motion and it also follows that the power or torque developed in reverse motion will be greater than that in direct motion.

Operation of the invention

The mechanical principles pertaining to the operation of the flexible enveloping means are graphically set forth in Figs. 23 to 28 inclusive where these plan views represent progressive stages in the movements of the flexible elements as the motor is operated in direct motion. In these views the lines $aa'$, $bb'$, $cc'$, ... $ll'$ represent the horizontal projections or traces of the elements of the enveloping means in counter-clockwise order about the axis 36 and the small circles 425 and 525 at the ends of these lines represent the terminal supports of the elements in the upper and lower rotors respectively. In these views the letters $a$, $b$, $c$, etc., indicate the inner ends of the festooned elements which are attached to the lower rotor and the primes of these characters indicate the outer ends thereof secured to the upper rotor.

I shall first explain the operation of the invention as if the grabbing device were unloaded and with the tell-tale O hooked up by means of the bolt 467 so that the signalling means will be inoperative.

Figure 23:
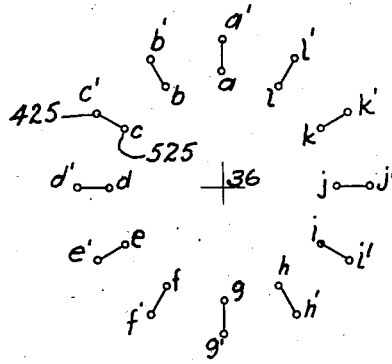
Figures 23, 24, 25, 26, 27 and 28 are diagrammatic representations, in plan, of characteristic phases or positions assumed by the festooned elements of the enveloping means during successive steps of the operation of the invention.

In Figure 1 the festooned elements are shown as hanging in radial planes (with reference to axis 36) which view corresponds with Fig. 23 and is indicative of zero angular lead between respective terminals of the elements. This is the normal condition when the motor is quiescent and the device is open or ready to begin certain grabbing operations and represents what I have herein designated neutral phase.

As a starting place in the explanation of the mode of operation of the invention the assumption is here made that the device is in neutral phase.

Unless stated to the contrary the following described operations apply to direct motion.

In passing from neutral phase (Fig 1) directly to the closed or globated phase (Fig. 2) turn valve E to deliver high pressure air via draft tube H to simultaneously release brake L and to engage clutch J and open valve D to deliver low pressure air to open valve B to run the motor in direct motion. This will cause the two rotors to rotate in their respective opposite directions to effect accumulative angular lead therebetween as shown in Figs. 24, 25, 26 and 27 which indicate leads of 75, 150, 180 and 270 degrees respectively and which are arbitrarily so taken.

For convenience of illustration the angular lead about axis 36 is measured between the radii through the terminal connections of the $aa'$ element with the radius through the lower rotor terminal parallel to the longer edge of the drawings.

Figure 26:
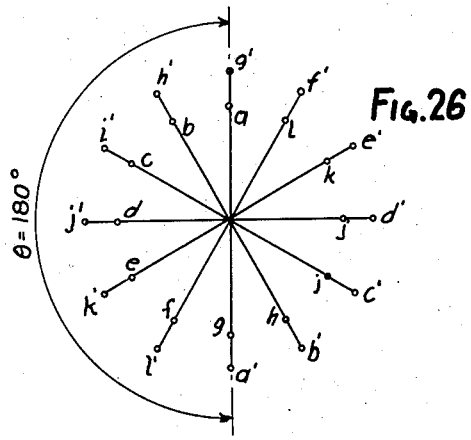
Figure 24:
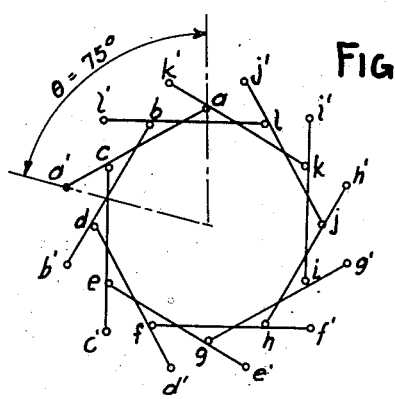
Figure 25:
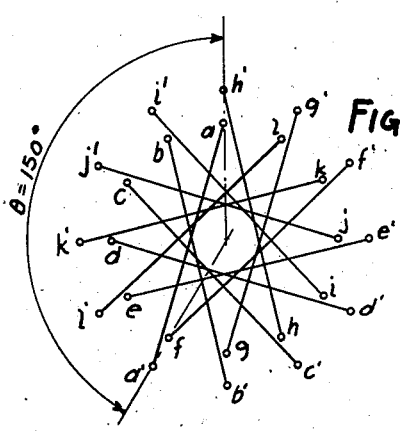

In Fig. 23 the span of each element, as represented by the length of the lines $aa'$, $bb'$ ... etc., is one half the difference of the respective rotor diameters through the points of suspension or terminal supports of the festoons. In turning one or both rotors to effect the accumulative lead as represented in Figs. 24, 25 and 26 the span of the elements progressively increases until in Fig. 26 it is equal to one half the sum of the said rotor diameters. This increase in span of the elements is equal to the lower rotor diameter and causes corresponding decrease in the sag of the elements which means that the intermediate portions of the festooned elements are caused to be pulled up toward the rotors accordingly. It should also be noted that the radial distance from the axis 36 out to the planes of the catenaries decreases as the angular lead increases until, in the theoretical condition of Fig. 26, the elements $aa'$, $bb'$, $cc'$, ... $ll'$ are drawn in or are constricted to make contact with each other at the axis 36.

Figure 27:
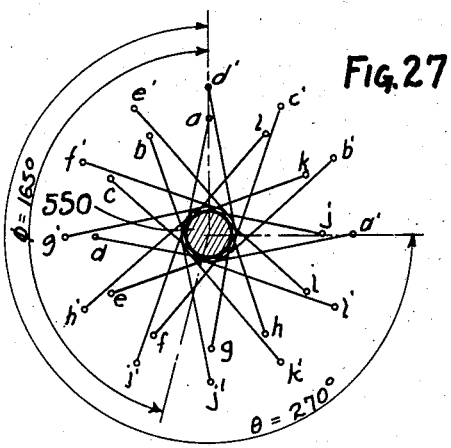

Figure 26 represents the theoretical condition as if the elements of the enveloping means were of zero thickness. Under actual working conditions the elements will make common contact before the angular lead becomes 180 degrees which depends upon the thickness of the elements. This condition is illustrated in Fig. 27 where the lead $\phi$ is arbitrarily assumed as 165 degrees. Once the elements or connectors are drawn together to make common contact further increase in the angular lead will cause the inner legs of the festooned connectors to twist themselves up as a rope thus forming a core 550 around which the outer legs will also wind themselves if the lead is sufficient. Figure 27 then graphically represents the globated phase which is pictorially shown in Fig. 2 the device being empty.

Now suppose the device as shown in Figs. 1 and 23 be lowered over a bag of grain (or other object of circular cross-section) and the rotors then be turned until the enveloping means is constricted so that the secant planes in which the festooned elements lie are tangent to the sides of the object. Figures 24 and 25 also represent this condition depending upon the size of the object. If the lead be increased after the elements make contact with the object the central portion of each element will be spirally wrapped therearound.

Figure 28:
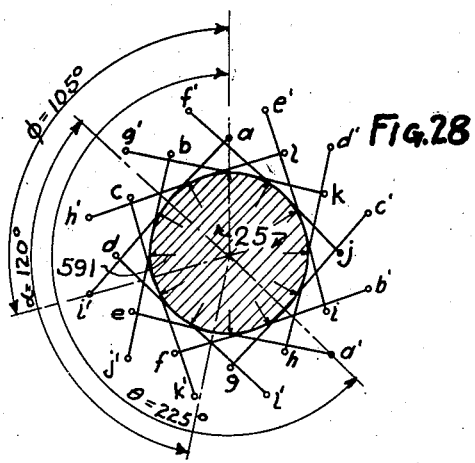

In Figure 28 the device is diagrammatically shown with an object 25 enveloped therein. In this view the connectors apparently first made contact with the object when the lead indicated by $\phi$ was 105 degrees. As the lead was further increased, the central portions of the connectors were spirally laid against the object until the motor was intentionally stopped or stalled when the lead $\theta$ became, say, 225 degrees in which case each element contacts the object over an arc represented by $\alpha = 120$ degrees, the end portions of the connectors being tangent to the inclasped object.

Figure 4:
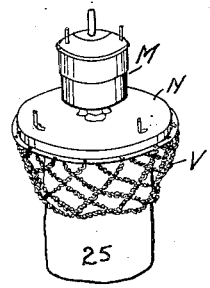

Figure 4 is a pictorial representation of the grabbing device as it appears when inclasping a sack of grain and illustrates one of its characteristic enveloping phases of which there are many, the variations thereof depending upon the shape, relative size, and nature of the article inclasped. Without further distinction Figs. 4 and 28 illustrate what I designate enveloping phase.

While the above explanation of the operation of the device applies specifically to direct motion of the motor and the lay or the wrap of the elemental connectors, as shown in the drawings, corresponds to that resulting from direct motion it should be apparent that the device can be operated in reverse motion in which case the lay of the elements would be the reverse of that shown.

It should also be apparent that to release an object which has previously been inclasped as shown in Figs. 4 and 28 it is necessary, simply, to operate the motor in the direction reverse to that of the grabbing operation. The enclasped object thus can be dropped from a suspended position.

Figure 2:
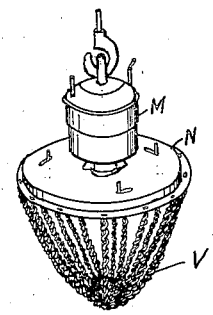
Figures 2, 3 and 4 are perspective views of the grabbing device detached from the crane.

Under actual working conditions there may be instances where, due to a previous operation, the device will be empty and partly closed as shown in Figs. 24 or 25 or fully closed as in Figs. 2, 26 or 27. It may occur that the total lead between rotors is more than 360 degrees for example where the view of Fig. 27 also represents those cases where the lead is one or more revolutions plus 270 degrees. When one of these conditions obtain the device can be opened up again in either one of two ways. The more obvious method is for the operator to observe the lay of the globated elements to determine if it is right hand or left hand and then to operate the motor in such direction as to restore the flexible elements to the condition of neutral phase. To open up the device in this manner it is essential that the operator be in position to see the grabbing device and this operation also depends somewhat on the skill of the operator.

Figure 3:
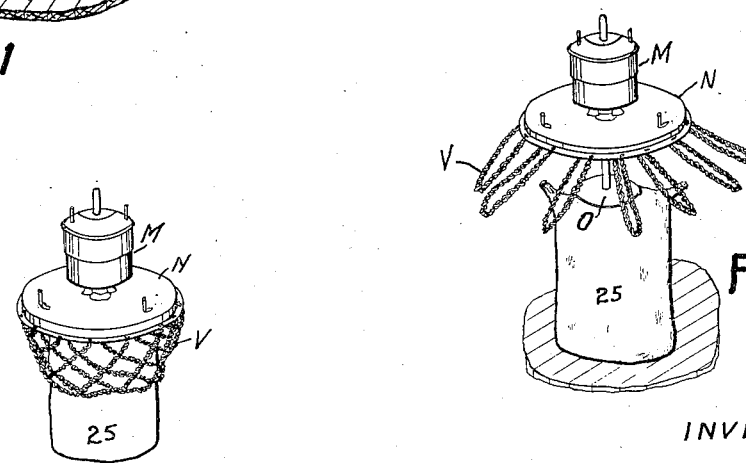

The other method to open up the device is intended for general use and can be performed in those cases where the operator can not see the grabbing device during the loading or unloading operations. In this method first turn valves E and 249 to relieve air pressure from draft tube to make sure that the brake L is engaged and that clutch J is disengaged and turn valve D to operate the motor in either direction. In this case both rotors and the flexible girdle will be rotated together in the same direction about axis 36 and the centrifugal forces acting on the flexible enveloping means will expand the same. Now if valve E be turned to deliver low pressure air to release the brake L the centrifugal pull in the festooned elements acting on the rotors will tend to restore the rotors to the condition of zero lead and the device can thus be spun as indicated in Fig. 3 which represents what I have herein designated spread phase.

The carrier unit N can be spun indefinitely in reverse motion of the motor with the rotor brake L released or if the pressure is relieved from the draft tube the spinning operation can be maintained with the rotors locked together. In direct motion this spinning operation can also be continued indefinitely because some pressure can be maintained in G so long as valve E is open to pass low pressure air which is incapable of engaging the clutch J.

There are several objectives which can be attained by operating the girdle in spread phase among which are the following:—(a) Where the grabbing device is carried by a fast moving crane or where it is jerked around by the boom and for those cases where the work must be performed in a strong wind this spread phase operation will overcome the tendency of the festooned elements to sway or to swing in which would interfere in neutral phase operation under similar conditions. Where the horizontal dimension of the object to be lifted is greater than the diameter inside the festooned elements in neutral phase this spinning operation can be used in either of two ways each having its advantages—(b) By continuing the spinning operation until the girdle is lowered in place over the object and then stopping the motor the flexible elements will gravitate as drapes on the object so the loading operation can be completed as in neutral phase operation. (c) If the girdle is maintained in the spinning phase and the clutch is then engaged just as the girdle is lowered in place on the object the grabbing operation will be instantaneous so this method of operation can be used where speed is required. (d) Where the height of the object to be lifted is less than the sag of the festoons and the girdle is constricted directly from spread phase the girdle elements close up from the horizontal position and therefore engage the upper part of the object—in other words the elements thus are not likely to be pulled under the object. Stated in another way this operation in spread phase provides means to avoid making frequent adjustment in the length of the festooned elements. (e) In those cases where hard smooth cylindrical objects are handled and this spread phase operation is resorted to—the pitch of the spirally wrapped flexible elements on the inclasped object is less than and the circumferential contact thereof is greater than and the grip or hold seems to be more secure than where the loading is done by starting from neutral phase. (f) Where the device is equipped with a tell-tale and this instant operation is employed the motor will be stopped at the completion of the loading operation.

Referring to Figs. 24 and 25 the trace of each element crosses those of its neighbors and is crossed by them although the elements do not contact each other. It should be noted that the inner leg portion of each trace is crossed exteriorly by the outer leg portion of its clockwise neighbors and that the outer leg portion of each trace is crossed interiorly by the inner leg portion of its counter clockwise neighbors. With the device empty the several elements do not contact each other except as explained in connection with Figs. 26 and 27. But when the device is loaded as indicated in Figs. 4 and 28 that portion of each element in contact with the object will be drawn in contact with its neighbors. This multiple crossing of the elements on the enclasped load forms a sort of self adjusting basket conformable to the load.

The enveloping means hanging freely as in Figs. 1, 23, 24, 25 and 26 are in tension due to gravity. This condition also obtains in Fig. 28 until the enveloping means are drawn in to contact the object when further operation to increase the lead causes frictional engagement of enveloping means on the sides of the object and between the crossed elements which causes the elements to be progressively strained up to the instant the motor is stopped.

In Fig. 28 the arrowed radial lines 591 indicate graphically the horizontal components of the equilibrants of the tensile forces in the several elements of the enveloping means. The sum of the vertical components of these forces equals the weight of the object lifted (that is the weight of the load 25) hence the horizontal components 591 are proportional to the weight of the load 25. This fact, as will appear in connection with the explanation pertaining to the operation using the tell-tale, has novel application in the handling of perishable goods like potatoes in sacks and also in handling fragile materials.

While the diagrams, Figs. 23 to 28, apply specifically to the individual elements or the chains as comprising the enveloping means the herein described operating principles also apply to any endless form thereof as disclosed.

Reference has been made in this specification concerning relative movement of one rotor or supporting means for the one end of the festooned elements with respect to the other rotor or support. By way of definition relative movement as used herein is intended to apply also to those constructions where either support is held stationary and the other one only is caused to move to effect accumulative angular change therebetween.

In the statement of invention reference is made to constructions wherein the carriage means are adapted to move along the periphery of a curved frame not circular in shape. The essential requirement is that the track be curved so that relative movement therealong of the respective terminal supports of the festooned elements will effect angular lead or change therebetween.

Where the track is of oval or elliptical shape it will be found that the change in the sag and in the span of the festooned elements will not be uniform for a given magnitude of relative movement between terminal supports of the several elements. At the ends of such a track where the curvature is greater than at the sides a given movement will not effect as much increase in the span nor decrease in the sag as will occur along the sides of the frame. The length of the respective elements can be adjusted before undertaking such operations as raising a sunken ship so as to compensate for these conditions.

*Operation of the grabbing device—using the tell-tale*

If at the beginning of the grabbing operations the tell-tale be released from its holder bolt 467 and be thrust downward in the draft tube by opening valve E to pass low pressure air and the grabbing device then be lowered by the crane until the disc 462 comes in contact with the object to be lifted the extended but retractible plunger 461 serves as a feeler whereby the operator may judge the additional distance the device should be lowered before he engages the clutch which will occur upon increasing the pressure in the draft tube. During this time if the crane load line be operated so as to cause part of the weight of the grabber to be borne on the plunger, thus to retract it, the change in pressure in the draft tube will cause the gage 257 (Fig. 7) to respond accordingly which will also indicate the desired information to the operator. These signalling operations may be carried on while the device is quiescent as in neutral phase and while it is operating in spread phase. In the latter case if the motor is operating in direct motion the motor can be stopped by the simple operation of lowering the device until the tell-tale is fully retracted whereby the push rod 213 will be forced up to raise the sleeve 222 to cut off the air. While the success of these operations is somewhat dependent upon the skill of the operator this last mentioned signalling operation also can be utilized as a safety measure where the article then under the open device is of a perishable nature so that the operator should not allow the full weight of the grabbing device to be borne on the article. In this case the dropping of the centrifugally positioned elements comprises visible signalling means.

When operating in direct motion suppose the device has been lowered by the crane to a position such that the tell-tale has been retracted by contact on the object to be lifted to within a few inches of its highest position and that the clutch J is then engaged thus to cause the flexible elements to constrict to that stage represented in Fig. 24 in which case the elements begin to touch the sides of the object. Further operation, say to the stage represented in Fig. 28, will occasion the simultaneous increase in span, decrease in sag and tendency to further constrict the elements the novel result of which is to lift the object independently of crane movement. When the foregoing operation reaches a certain stage the tell-tale will be raised to force the sleeve 222 up from its position shown in Fig. 20 to that shown in Fig. 5 which will automatically stop the motor at the same time allowing the entrapped air in pipe 206 and chamebr 303 of valve B to escape via the relief duct 80.

Where there are a number of similar objects to be lifted the nature of which require careful handling the length of the tell-tale can be adjusted as previously explained so as to stop the motor when the plunger has been retracted a definite distance which amounts to the same thing as saying—to stop the motor when the load has been lifted a predetermined distance or as soon as the squeezing forces of enveloping means on the object reach a predetermined intensity.

It will be seen then that this independent lifting of the load answers the same purpose as a trial lifting of it to determine whether the attachment is secure and to make sure that the object will remain in upright position during crane operations because any three of the several flexible elements thus can come into play to automatically provide three point suspension.

When the power is cut off by the operation of the tell-tale there will be some air entrapped in the annular passageway 85 and in at least two of the cylinders 35 to maintain the torque to keep the connectors tightly drawn against the object; this independently of the action of the brake L. Owing to the fact that the length of the enveloping elements can be adjusted so that contact can be made over the entire height of the object, the unit intensity of the squeezing forces will be small and goods of a perishable or fragile nature can thus be handled without injury.

Certain objectives of this invention having to do with the variety and nature of the goods and of the conditions under which the goods must be handled have been attained in the novel motor construction whereby the speed of the motor and the torque developed in reverse motion are greater than in direct motion.

If the articles handled are heavy rather than bulky and are not so likely to be injured where the crane operations are speeded up, the device can be run in reverse motion. In this case the tell-tale may still be used as a feeler and to cooperate with the pressure indicator 257.

If it is desired to so use the tell-tale while working in reverse motion for the grabbing operations the opening up of the device and the unloading operations then will be done by operating valve B via the by-pass valve 322.

If it is not desired to use the tell-tale it can be hooked up by means of the turn-bolt 467. The overall length of the tell-tale can be adjusted by turning the stem 466 in its threaded connection in the plunger 461 so that when the shortened tell-tale is inoperative it will not be in its highest or fully retracted position in the draft tube H. Hence the sleeve valve 222 can be operated in the usual way to open the passageway 79 and thus to operate valve B.

*Unloading operations*

In Fig. 4 the flexible elements are shown as crossing each other and are tightly drawn against the inclasped object. These elements are of the same lay or of the same direction of spiral wrap on the inclasped object as was above explained with reference to Figs. 24 and 25 and as also may be seen in Fig. 28. As the flexible elements are in tension and tend to compress the object it follows in those cases where the object is of a yielding or elastic nature and can be so compressed that if the rotor lock L is suddenly released by low pressure air in draft tube to free the lower rotor the torque in the connectors will cause the lower rotor to spin backwards at the same time imparting a spinning motion in counter-clockwise direction to the object as it falls from the device. This unloading operation is intended where it is permissible to drop the load from the suspended position. This unloading operation while it is a rather speedy one can be done much faster by momentarily opening valve D to pass high pressure air to operate valve C at the same time maintaining low pressure air in draft tube so the upper rotor only will be motor driven a partial revolution while the lower rotor will be free to spin in counter-clockwise direction which is the same direction it would rotate (in reverse motion) if the clutch J were engaged.

By spinning the loaded device with the rotors locked together until the desired rotative speed is reached and then upon releasing the brake L the initial spinning velocity of the dropt load can be increased. These unloading operations are such as might be useful in military operations with the aid of aircraft.

In effecting the release of an object from the enveloping means other than by dropping it as previously explained, such operation can be done in several ways each of which has special advantages and is intended for certain purposes.

If the load is to be laid down carefully on a floor or other support or on a pile of previously handled material the unloading operations can be effected as follows:

(1) By admitting air pressure in draft tube to unlock the lower rotor and raise the grabbing device by the crane, the flexible elements having weight and under some tension will automatically tend to restore the lower rotor to its neutral phase.

(2) Same as (1) but momentarily reverse the motor and simultaneously apply low pressure in draft tube.

(3) Same as (2) but apply high pressure air in draft tube which will also drive lower rotor in reverse direction.

If the connectors are drawn underneath the load or if they are caught under projecting parts of the load the unloading operations can be expedited by alternately operating the motor in reverse and forward motion and at the same time operating the crane to alternately raise and lower the device.

The unloading operations can also be effected by operating the mechanical releasing means P, the operation of which has been explained.

From the foregoing description pertaining to the various movements of the rotors to operate the enveloping means as stated it will be observed that the required motor performance is unusual. The novelty of the motor resides first, in that it is a remote controlled motor; second, in that it is a reversible motor adapted to remote control; third, that it will maintain its torque while quiescent; fourth, that it is a slow speed motor in direct motion and a speedier one in reverse motion; fifth, that it will develop a greater torque in reverse motion than in direct motion; this last with corresponding increase in speed rather than with speed reduction as would occur when back gearing is resorted to.

One of the objects of this invention is to provide a light weight machine capable of handling heavy loads. It will be observed that all parts of the load carrying means, with the exception of the frame or top rotor, are subjected to tensile stresses which permits of lighter construction than when compressive or flexural stresses occur. Moreover, in those cases where the loads are heavy or capacity loads it is not necessarily intended that the motor be powerful enough to lift the load independently of crane movement. Where the device is lowered by the crane until the enveloping operation is completed the motor requirements are unaffected by the magnitude of the load and it is only necessary for the motor to be capable of drawing the flexible elements snugly against the object handled.

Alternative construction

The grabbing device shown in Fig. 15 differs from that shown in Fig. 5 by reason of the omission therefrom of the pneumatic operated clutch J, the tell-tale O and associated draft tube parts, the tripping mechanism P, and in that the carrier and motor are not detachable. Due to the omission of the clutch, the lower rotor R is directly connected to the gear 51 and the carrier unit thus can not be spun in spread phase. The device as per Fig. 15 is of a cheaper construction than that shown in Fig. 5. The operation of the abridged cheaper device thus will be seen to require more attention on the part of the operator than will the more complete one shown in Fig. 5 and it is not so well adapted for employment where the operator can not see the device while operating it.

One of the analogous uses for the grabbing device is for such operations as pulling old driven piling which may be wholly or partly submerged and for pulling well casings. In the constructions intended for this purpose I propose to move the motor mechanism from the axial position with relation to the carrier unit so the piles can be withdrawn upward through the device. In operating this pile puller it is to be lowered with the enveloping means in neutral phase encompassing the pile to be pulled and then constricted on the pile. Then the crane hoist is to be operated to raise the pile a short distance and the enveloping means are to be slacked off to drop down for another bight.

Endless enveloping means

That portion of the enveloping means which, in the views of Figs. 1 and 5, comprises the inner legs of the festooned elements is replaced in the construction shown in Fig. 17 by an endless form of girdle or skirt which may be of chain cloth V' as illustrated or it may be of fabric such as canvas or it may be of rope netting the essential thing is that it be of flexible material. The operation of the grabbing device is essentially the same whether the enveloping means is of the individual chains shown in Fig. 5 or of the endless form as disclosed. However there are some things which can be handled more satisfactorily with the endless enveloping means than with that illustrated in Fig. 5. In handling animals and in handling a group of objects at a time the endless enveloping means would be preferable. Where the object to be handled is smaller than the diameter of the lower rotor and the endless enveloping means are used the device can be lowered, in neutral phase, over the object and the skirt can be closed under the object. This operation is analogous to that of stripping a sack over the object and then pulling a draw-string to close it under the object.

Where the grabbing device is used for handling a cock of loose hay or sheaved grain in shock it might be necessary to attach suitable weights at the bottom of the festoons so as to break down the stubble and enable the enveloping means to be drawn under the load. A heavy chain threaded circumferentially through the festooned elements will be found to be satisfactory for these operations.

Having thus described the construction and operating principles of the invention, I claim:

1. A device which comprises: a flexible girdle the elements thereof disposed in closed configuration; a pair of supports adapted for the suspension of the girdle elements therebetween; and means to rotate one support with respect to the other support to control the operation of the girdle.

2. A device for holding objects which comprises: a flexible girdle; a pair of concentrically disposed and relatively rotatable annular members adapted to support the girdle by the respective extremities of its elements; and means to control the relative movement of the annular members to constrict and to expand the girdle.

3. In a grabbing device: a pair of concentrically disposed annular members, relatively a rotor and a stator, flexible enveloping means the elements thereof disposed in closed configuration and festooned from rotor to stator; and means mechanically interposed between the rotor and stator to control the operation of the enveloping means.

4. In an automatic grabbing device: a pair of concentrically disposed rotors; a flexible girdle carried by the rotors; means adapted to spin both rotors and the girdle as a unit thus to centrifugally expand the girdle and means to cause relative movement of one rotor with respect to the other rotor to effect accumulative angular lead therebetween thus to constrict the girdle.

5. In a device to hold objects: a pair of annular members; means to mount them for rotation about an axis common to both of them; a flexible girdle peripherically carried by the annular members; means to rotate one of the annular members with respect to the other annular member thus to constrict the girdle on an object and means to effect unitary rotation of the device and the inclasped object about said axis.

6. An automatic grabbing device which comprises: a pair of concentrically disposed rotors; a flexible girdle peripherically carried by the rotors; means to spin both rotors and the girdle as a unit to centrifugally expand the girdle and means to reverse the direction of rotation of one of the rotors simultaneously with the continuance of said rotation of the other rotor thus to instantly constrict the girdle.

7. In a device to hold objects: a pair of concentrically disposed annular members relatively a rotor and a stator; a girdle the elements thereof disposed around the peripheries of the annular members and flexibly connected thereto; means to rotate the rotor on the stator to constrict the girdle elements on an object; means to maintain a self tightening grip of the girdle on the inclasped object; and means to reverse the direction of rotation of the rotor on the stator to expand the girdle to release the object.

8. A grabbing and carrier device which comprises: a power unit; a detachable carrier unit comprising, a pair of concentrically disposed annular members relatively a rotor and a stator and a flexible girdle the elements thereof suspended between the periphery of the rotor and the periphery of the stator; means to operably carry the power unit on a crane; means to operably carry the carrier unit on the power unit; means to control the rotation of the rotor on the stator to constrict and to expand the girdle when the power unit and the carrier unit are engaged; and means to maintain the girdle in its constricted phase and to expand it when the carrier unit is disengaged from the power unit.

9. In the art of handling objects with cranes: a device which comprises: a flexible girdle; a pair of concentrically disposed annular members relatively a rotor and a stator to support the girdle; means to rotate the rotor on the stator to constrict the girdle on an object and selective means to control the operation of the first means thus: to limit the pressure exerted by the girdle on the inclasped object as governed by the weight of the object and to effect the operation of the device whereby the pressure exerted by the girdle on the object is governed by the power capacity of the first means.

10. In a grabbing and carrier device: a rotor; a stator; a flexible girdle the elements thereof suspended from the periphery of the rotor to the periphery of the stator; means to control the rotation of rotor relative to stator to constrict the girdle whereby the pressure exerted by the girdle on an object inclasped therein is greater in one direction of rotation than in the other direction.

11. In a device for self attachment to objects the combination which comprises: a pair of concentrically disposed members relatively a rotor and a stator; a flexible girdle carried thereby; means to revolve the rotor on stator to effect accumulative angular lead therebetween to constrict the girdle upon an object; and remote control means to effect selective unloading operations whereby the object can be dropped from a suspended position or be laid down on a support and then the girdle be detached therefrom.

12. In a device as disclosed for cooperative use with cranes or other means for transporting loads: a pair of concentrically disposed annular members; flexible enveloping means festooned thereto; means to spirally wrap the flexible means taut around an object; means to maintain torque between the annular members; and means to release the last means to rotate the inclasped object as it gravitates from the device.

13. In a carrier: a pair of concentrically disposed members relatively a rotor and a stator; a flexible girdle the elements thereof festooned to the rotor and stator; means to rotate the rotor on the stator to expand and to constrict the girdle and means to control the operation of the device whereby to limit the pressure of the girdle on an object therein in proportion to the weight of the object.

14. In the art of handling objects with cranes, an automatic grabbing and carrier device which comprises: a frame normally carried on the load line of a crane; a rotor on the frame; a brake to prevent movement of rotor on the frame; a flexible girdle the elements thereof suspended from rotor to frame; means to release the brake, means to rotate the rotor with reference to the frame to constrict the girdle on an object and means to effect selective unloading operation of the device including gravitational discharge of the object therefrom or to release the gridle from the object when the object reposes on a support.

15. In an automatic grabbing device: a pair of concentrically disposed annular members, relatively a rotor and a stator, comprising a frame; means to operably carry the frame on a crane; a flexible girdle festooned to the frame; means to control a predetermined directional rotation of rotor on stator to open the girdle; and means to control the relative rotation, in reverse direction, of rotor on stator to constrict the girdle to conform to objects of variable size and shape.

16. The combination with a crane of the grabbing device specified in claim 15 and coactive control means whereby the constricting operation of the girdle will be automatically stopped once it reaches a predetermined stage.

17. A device which comprises: a main supporting frame; a track of curved configuration on the frame; a train of carriages spaced along the track; a flexible envelope; reinforcing ribs or elements in the envelope adapted for flexible suspension from the frame to the carriages; and means to control the rotation of the carriages on the track to constrict and to expand the envelope.

18. An attachment for cranes which comprises: a main frame; curved track means on the frame; carriage means adapted to travel on the track; flexible enveloping means festooned from the frame to the carriage means; automatic means to prevent unintentional movement of the carriage means relative to the track; control means to release the restraint of the said automatic means and means to control the movement of the carriage means on the track with the simultaneous release of the restraint of said automatic means to constrict and to expand the enveloping means incident to handling objects by means of cranes.

19. In a grabbing device the combination of a frame; a curved track on the frame; carriage means on the track; a flexible girdle; an automatic brake to prevent unintentional movement of carriage means on the track; means to rotate the frame and carriage means in fixed relation; remote control means to release the brake; and remote control means to govern the movement of the carriage means on the track to expand and to constrict the girdle incident to handling objects.

20. In the art of handling heavy or bulky objects by means of cranes, a grabbing device which comprises: a frame normally carried on the load line of a crane; a track of curved configuration on the frame; carriage mechanism on the track; a flexible girdle festooned from the frame to the carriage mechanism; means to control the movement of the carriage mechanism on the track; means to prevent unintentional movement of carriage mechanism on the track; remote control means to effect either gravitational unloading operation or to effect disengagement of the device from its load when the object reposes on a support; and manually operable means to effect unloading operations in lieu of said remote control operation.

21. In a grabbing device: flexible enveloping means; mechanism to operate the same which comprises: a primary driver; a pair of concentrically placed rotative elements adapted to be driven by the primary driver; a self-disengaging clutch intermediate the primary driver and one of the driven elements; a self engaging brake intermediate the driven rotative elements; and means adapted to remote control of the operation of the device.

22. In a grabbing device: a pair of driven members adapted to be rotated simultaneously in opposite directions; a pair of concentrically disposed rotors; positive transmission means intermediate one of the driven members and one of the rotors; a clutch intermediate the other driven member and the other rotor respectively; a flexible girdle peripherically suspended between the rotors; means to control the rotation of the driven members and the positively connected rotor thus to spin the girdle and means to engage the clutch simultaneously with the operation of the last means thus to instantly constrict the girdle.

23. In a grabbing device the employment of a flexible skirt or flexible enveloping means and mechanism to control the operation thereof which comprises: a pair of oppositely rotative primary elements; a pair of independently rotative secondary elements; positive transmission means intermediate one of said primary and one of said secondary elements; a self-disengaging clutch intermediate the other primary and secondary elements; a self-engaging brake intermediate the secondary elements; and selective means whereby to release the brake without engaging the clutch or to effect the simultaneous release of the brake and the engagement of the clutch.

24. A device to hold objects which comprises: a pair of concentrically disposed rotors; a flexible girdle the elements thereof suspended between the peripheries of the rotors; a motor; transmission means intermediate the motor and the rotors; a retractable plunger; means to thrust the plunger within the girdle to maintain resilient contact on an object; automatic means to control the operation of the motor whereby to start the motor when the plunger is extended thus to spin the girdle and to stop the motor when the plunger is retracted.

25. In combination, a motor unit including a motor; means to control its operation; a detachable carrier unit which comprises: a suspensory frame; carriage mechanism adapted to travel along the periphery of the frame; automatic brake means adapted to prevent unintentional movement of the carriage mechanism on the frame; enveloping means festooned from the frame to the carriage mechanism; manually operable means to release the brake to effect unloading operation of the carrier unit and remote control means adapted to cooperate in the motor feed to release the brake independently of said manually operable means.

26. In a grabbing device: a motor; a pair of rotors; flexible enveloping means carried by the rotors; a brake intermediate the rotors; transmission means intermediate the motor and the rotors; remote controlled means to govern the operation of the device to spin the rotors and enveloping means to open the device by centrifugally actuated means preparatory to a grabbing operation and remote controlled means to effect selective unloading operations including gravitational discharge of load from the device.

27. In an automatic grabbing device: a pair of rotors; a flexible girdle the elements thereof festooned to the rotors; a motor; a pair of driven elements adapted to be simultaneously rotated in opposite directions by the motor; positive transmission means intermediate one of the driven elements and one of the rotors; transmission means including a clutch intermediate the other driven element and other rotor respectively; and means to control the operation of the device.

28. In combination: a frame normally carried on the load line of a crane; endless track means on the frame; a continuous train of carriage means on the track; flexible enveloping means carried by said supports; a motor carried by the frame; transmission means intermediate the motor and the carriage means; means to control the operation of the motor to drive the carriage means along the track; automatic means to lock the carriage means to the track; selective means to release the lock means including remote control means operable in the motor feed and means adapted for manual operation independently of the remote control means.

29. In an automatic grabbing device: a pair of rotors; a flexible girdle the elements thereof festooned to the rotors; a motor; a pair of driven elements adapted to be simultaneously rotated in opposite directions by the motor; positive transmission means intermediate one of the driven elements and one of the rotors; transmission means including a clutch intermediate the other driven element and the other rotor respectively; a retractable plunger carried by the device and means to control the operation of the device including automatic means actuated by the cooperative operation of the flexible girdle and the plunger adapted to stop the motor upon the completion of the grabbing or loading operation.

30. In a device of the described class: a reversible motor; remote control means to govern its operation; a pair of driven elements adapted to be simultaneously rotated in opposite directions by the motor; a pair of nested rotors; transmission means intermediate one of said driven elements and the upper rotor; a self-disengaging clutch intermediate the other driven element and the lower rotor; flexible enveloping means the several elements thereof disposed as catenaries or festoons from the periphery of the upper rotor to similar positions on the lower rotor the whole thus forming a depending skirt below the rotors; a self-engaging brake to prevent unintentional movement of one rotor with respect to the other rotor; remote control means to release the brake without effecting the engagement of the clutch; and remote control means to release the brake and to simultaneously engage the clutch.

31. The device as specified in claim 30 in combination with control means adapted to coact with the enveloping means to automatically stop the motor at a predetermined stage of the grabbing operation.

32. A grabbing device which comprises: pneumatic motor propelled or driving means; a pair of driven elements adapted to be simultaneously rotated in opposite directions by said driving means; cam means actuated by one of said driven elements; valve means actuated by the cam means to control the air to operate the motor; a pistoned shifting member cooperating with the cam means; a secondary tank carried by the motor; means to maintain air pressure in the tank and to operate the shifting member to position the cam means to run the motor in a predetermined direction; pneumatic control means adapted to work in opposition to the pressure from said secondary tank to shift the cam means to run the motor in direction reverse to that above mentioned; a low pressure operable valve cooperating with the shifting member and adapted to be opened only by low pressure air to run the motor on air supplied via said secondary tank; a high pressure operable valve cooperating with said shifting member adapted to work in opposition to the continuous secondary tank pressure to run the motor in reverse direction on air supplied from another source; a framed shell or container for the motor mechanism; a pair of nested rotors carried by the shell; a flexible skirt carried by the rotors; transmission means intermediate one of said driven elements and one of the rotors; transmission means including a self-disengaging clutch intermediate the other driven element and other rotor respectively; a self-engaging brake intermediate the rotors; means to release the brake; means to simultaneously release the brake and to engage the clutch; and means to control the operation of the motor.

33. The grabbing device specified in claim 32 wherein the means to control the simultaneous operation of the brake and the clutch and the means to control the directional operation of the motor comprise pneumatic operable means adapted to selective operation contingent on the intensity of pressure therein.

34. The combination as specified in claim 32 wherein the transmission means comprise a draft tube; a slide valve in the draft tube to control motor feed; a plunger in the draft tube protruding downward through the rotors; means to control the air pressure in the draft tube; and means to keep the slide valve normally open but adapted to coact with the plunger, upon a predetermined retractive movement thereof, to close the valve to stop the motor.

35. The combination specified in claim 32 wherein a portion of said transmission means are hollow comprising a draft tube; a pneumatic plunger protruding through the rotors and adapted to operate as a piston in the draft tube; means to control air pressure in the draft tube and signal means adapted to respond to change in pressure in draft tube due to the movement of plunger.

36. In a grabbing device the combination which comprises: a frame normally carried by a crane; pneumatic propelled driven means; cam means actuated by the driven means; timing valve means actuated by the cam means; mechanism adapted to shift the cam means to operate the valve means to control the operation of the device in either forward or reverse direction; a flexible skirt carried by said frame; transmission means cooperable with said driven means adapted to govern the constriction and expansion of the flexible skirt; and remote control means to govern the operation of the device.

37. In a grabbing device the combination of: a reversible pneumatic motor; a pair of driven elements adapted to be simultaneously revolved in opposite directions by the motor; a pair of nested rotors comprising an upper rotor and a lower rotor; flexible enveloping means peripherically carried by the rotors; a self engaging brake intermediate the rotors; positive transmission means intermediate one of the driven elements and the upper rotor; a self releasing clutch intermediate the other driven element and the lower rotor; remote control means to release said brake without effecting the engagement of said clutch; remote control means to effect the simultaneous release of the brake and engagement of the clutch; and remote control means to govern the forward and reverse operations of the motor whereby the speed and torque are greater in one direction than in the other.

38. In a grabbing device for cooperative use with a crane for handling heavy or bulky objects: a reversible pneumatic motor; a framed shell for the motor; an air tank in the shell; a pair of driven elements adapted to be rotated in opposite directions by the operation of the motor; an upper rotor; a lower rotor; a pair of concentrically placed hollow shafts, the outer shaft engaging one of said driven elements and the upper rotor, the inner shaft engaging the other driven element and the lower rotor; a self-disengaging clutch in the inner shaft; a self-engaging brake intermediate the rotors; a flexible skirt carried by the rotors; the said hollow shafts comprising a draft tube; a check valve in said tank; means to maintain air pressure in the tank via said check valve; means to supply low pressure air in the draft tube to release the brake; means to supply high pressure air in the draft tube to engage the clutch and to simultaneously release the brake; means to control the predetermined direct operation of the motor on air via said tank; and means to control the reverse operation of the motor on air supplied from another source.

39. The grabbing device as specified in claim 38 wherein the motor is adapted to operate with greater speed and power in one direction than in the other direction.

40. A grabbing device which comprises: a motor unit; a detachable carrier unit; a flexible girdle the elements thereof disposed in closed configuration and festooned to the carrier unit; safety latched catches adapted to operably engage the motor unit and the carrier unit and means to control the operation of the engaged carrier unit whereby to expand and to constrict the girdle.

41. In a carrier unit comprising a detachable portion of the disclosed grabbing device the combination of: a suspensory frame; carriage mechanism adapted to travel along the periphery of the frame; automatic brake means adapted to prevent unintentional movement of the carriage mechanism on the frame; enveloping means festooned from the frame to the carriage means; and manually operable means to release said brake to effect unloading operations of the carrier unit.

42. In a carrier: a pair of members, relatively a stator and a rotor; means to rotatably support the rotor on the stator; flexible elements suspended from rotor to stator; means to lock the rotor to stator to prevent rotation of one with respect to the other; and means to release the lock.

43. In a crane accessory: a power unit; means to operably carry it on the load line of a crane; a detachable carrier unit which comprises: a rotor; a stator and a flexible girdle; means to operably carry the carrier unit on the power unit to control the rotation of rotor on stator to constrict the girdle; means to prevent rotation of rotor on stator when the carrier unit is disengaged from the power unit and means to release the last means to effect unloading operations of the carrier unit.

44. In a grabbing device: a pair of rotors; a flexible girdle the elements thereof festooned to the rotors; means to rotate the rotors and girdle as a unit to centrifugally expand the girdle; a retractable plunger disposed to make first contact of the device on an object to be handled; and control means, actuated upon a predetermined retractive movement of the plunger, adapted to coact with the first means to permit the centrifugally positioned girdle elements to gravitate to comprise visible signal means in the operation of the device.

45. In the art of cranes a device which comprises: a rotor; a stator; a flexible girdle the elements thereof festooned from rotor to stator; a retractable plunger adapted to maintain resilient contact on an object within the girdle; a signal remotely disposed with reference to the girdle; means to control the rotation of rotor relatively to stator to open and to constrict the girdle; and means to control the operation of the signal as governed by the reciprocal movement of the plunger.

46. In the art of handling objects with cranes, a grabbing device which comprises: a pair of concentrically disposed annular members, relatively a rotor and a stator; a flexible girdle the elements thereof suspended from the periphery of the rotor to the periphery of the stator and means to control the rotation of rotor on stator to constrict and to expand the gridle; in combination with signal means which comprise: a retractable plunger carried by the grabbing device; means to thrust the plunger down within the girdle to maintain resilient contact with an object within the girdle; a signal remotely disposed with reference to the grabbing device; and means to actuate the signal as governed by the reciprocal movement of the plunger caused first by the crane movement of the device relative to the object to be seized and second by the operation of the girdle in inclasping the object.

47. In the art of handling objects with cranes, a grabbing device which comprises: a pair of concentrically disposed annular members; a flexible girdle the elements thereof festooned to the annular members; a retractable plunger within the girdle; means to thrust the plunger down within the girdle to maintain resilient contact on an object; means to rotate one of the annular members with respect to the other annular member thus to constrict and to expand the girdle to handle objects; a signal remotely located with reference to the device and preferably at the control mechanism thereof; and means to operate the signal to accord with various conditions incident to loading the device as governed by the cooperative operation of the plunger and girdle on the inclasped object.

48. In a grabbing device for use with cranes to handle objects: a pair of rotors; a flexible girdle carried by the rotors; a motor; transmission means intermediate the motor and the rotors; a plunger carried by the device; means to thrust the plunger within the girdle to maintain resilient contact on an object; in combination with: a signal remotely located with reference to the grabbing device; a conductor therebetween; means to control the operation of the grabbing device whereby the signal will respond upon a limited movement of the plunger as that movement is caused first by the crane movement of the device relative to the object prior to the loading operation and second by the operation of the girdle in inclasping the object during the loading operation and means to automatically stop the motor at the completion of the loading operation as governed by a predetermined retractive movement of the plunger.

49. In a grabbing device: a pair of concentrically disposed members relatively a rotor and a stator; a perforated stiffening flange on one of these members; a rotatable collar on the flange; a girdle the elements thereof suspended from the non-collared member through said perforations on the collared member thence to the rotatable collar and thereby adapted for unitary adjustment with various conditions of operation by rotating the collar on its supporting member.

CLARENCE A. KELSO.